(12) United States Patent
Williams et al.

(10) Patent No.: US 10,921,602 B2
(45) Date of Patent: Feb. 16, 2021

(54) CONFORMABLE HMD WITH DYNAMICALLY ADJUSTABLE NESTED RIBBON

(71) Applicant: MICROSOFT TECHNOLOGY LICENSING, LLC, Redmond, WA (US)

(72) Inventors: Jason Paul Williams, Santa Clara, CA (US); Trevor Grant Boswell, Madera, CA (US); Leonardo Aldana, Dublin, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/404,938

(22) Filed: May 7, 2019

(65) Prior Publication Data
US 2020/0355926 A1     Nov. 12, 2020

(51) Int. Cl.
*G02B 27/01*     (2006.01)

(52) U.S. Cl.
CPC .. *G02B 27/0176* (2013.01); *G02B 2027/0152* (2013.01); *G02B 2027/0154* (2013.01); *G02B 2027/0161* (2013.01); *G02B 2027/0169* (2013.01)

(58) Field of Classification Search
CPC ........ G02B 27/0176; G02B 2027/0152; G02B 2027/0154; G02B 2027/0161; G02B 2027/0169
See application file for complete search history.

(56) References Cited

U.S. PATENT DOCUMENTS

| | | | | |
|---|---|---|---|---|
| 6,194,664 B1* | 2/2001 | Zamora | ................. | H02G 11/00 174/117 F |
| 2002/0163486 A1* | 11/2002 | Ronzani | ............. | G02B 27/0176 345/87 |
| 2005/0274842 A1* | 12/2005 | Rubenstein | .......... | G02B 6/4439 242/615.3 |
| 2008/0084359 A1* | 4/2008 | Giannuzzi | .............. | G09G 5/006 345/1.1 |
| 2015/0261291 A1* | 9/2015 | Mikhailov | .............. | G06T 7/251 345/156 |

* cited by examiner

*Primary Examiner* — Mark W Regn
(74) *Attorney, Agent, or Firm* — Workman Nydegger

(57) ABSTRACT

A head-mounted device (HMD) whose circumference is dynamically adjustable to conform to different head sizes and shapes is disclosed herein. The HMD includes a front-end and back-end housing. The front-end housing includes a first compute unit, and the back-end housing includes a second compute unit. The HMD also includes two adjustable flex fit arms that connect the front-end housing to the back-end housing. The HMD has an enclosed rounded boundary that is placeable around a user's head. The HMD also includes a nested flexible cable ribbon, which is nested within a cavity of one of the arms and which includes both a static bend and a dynamic bend. The bend radius for the dynamic bend is larger than the bend radius of the static bend. The dynamic bend enables the nested flexible cable ribbon to expand or contract when the circumference of the enclosed rounded boundary changes.

21 Claims, 16 Drawing Sheets

CONFORMABLE HMD WITH DYNAMICALLY ADJUSTABLE NESTED RIBBON

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." A head-mounted device (HMD) provides the display used by the user to view and/or interact with virtual images provided within an MR scene.

Currently, there are some "all-in-one" MR head-mounted systems. These systems are all-in-one because they do not physically attach to an external computer; rather, the HMD includes substantially all of the compute units necessary to provide an MR scene to a user, or the HMD at least includes adequate networking components to obtain the MR scene information in a wireless manner. Typically, these all-in-one systems include a substantial number of compute units in the front portion/area of the HMD, thereby causing the HMD to be very front heavy and uncomfortable for the user. Another typical design for all-in-one MR systems is to break out (i.e. "split") some of the compute elements located in the front end and allow those compute elements to be located elsewhere, but still near the front end to reduce latency.

For instance, some traditional all-in-one MR systems include an external section that users place somewhere else on their bodies (besides their heads), such as attached to their belts or even in their pockets. In some cases, this rear section can even be coupled to the rear end of the HMD through a large (and typically unsightly) bundled cable that extends from the front of the HMD to the rear of the HMD. In this regard, some systems have a split architecture that includes a front end and a back end.

Splitting the architecture has several advantages because it allows the front end to be lighter in weight. Unfortunately, traditional methods of performing this split have come with many undesired drawbacks and consequences as well. For instance, with a split architecture, the user either has to place a compute unit somewhere else on his/her body (this can be bothersome in its own accord) or the user's HMD will have large and unsightly cables running the length of the HMD. Traditional techniques, therefore, have not been optimal for users. Consequently, there is a need to improve how split HMD architectures are designed in order to resolve these undesired drawbacks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to wearable head-mounted devices (HMD) whose circumference is dynamically adjustable to conform to different head sizes and head shapes.

In some embodiments, the HMD includes a front-end housing and a back-end housing. The front-end housing includes a first compute unit (e.g., a CPU, GPU, HPU, any other type of processing unit, etc.) while the back-end housing includes a second compute unit (e.g., CPU, GPU, HPU, etc.). The HMD also includes two (e.g., a first and second) adjustable flex fit arms connecting the front-end housing to the back-end housing. Together, the front-end housing, the back-end housing, the first adjustable flex fit arm, and the second adjustable flex fit arm define an enclosed rounded boundary that is placeable around a head of a user. The HMD also includes a nested flexible cable ribbon nested within a cavity extending along a length of either the first or second adjustable flex fit arm. The nested flexible cable ribbon electrically couples the first and second compute units. Furthermore, the nested flexible cable ribbon includes a static bend in which the nested flexible cable ribbon folds back on itself at a first bend radius. Even further, the nested flexible cable ribbon includes a dynamic bend in which it folds back on itself at a second bend radius, which is required to be larger than the first bend radius and which is required to be larger than a minimum bend radius threshold. Consequently, the ribbon is folded in an "S"-like manner. The ribbon's dynamic bend is provided to enable the ribbon to effectively expand or contract in length (without stretching the wires within the ribbon) as a circumference of the enclosed rounded boundary changes (e.g., as the circumference gets bigger or smaller).

In some embodiments, the HMD also includes an adjustment wheel. When this adjustment wheel is turned, the circumference of the enclosed rounded boundary expands or contracts.

In some embodiments, the HMD additionally includes multiple adjustment snaps. These snaps are embedded, or nested, within the cavity that extends along the length of the first or second adjustable flex fit arm. The snaps are beneficially provided to allow the different portions of the arm to move independently of one another, thereby increasing the arm's overall flexibility and conformability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 specifically illustrates how an adjustment snap can be embedded within the arm's cavity.

FIG. 8 also shows how the wires within the ribbon can be configured in multiple different sections. One section includes a ribbon while another section includes a bundled cable that travels through a hinge to then be un-bundled to again form a ribbon that is connected to some of the compute units in the front-end housing.

DETAILED DESCRIPTION

Figure 1A:
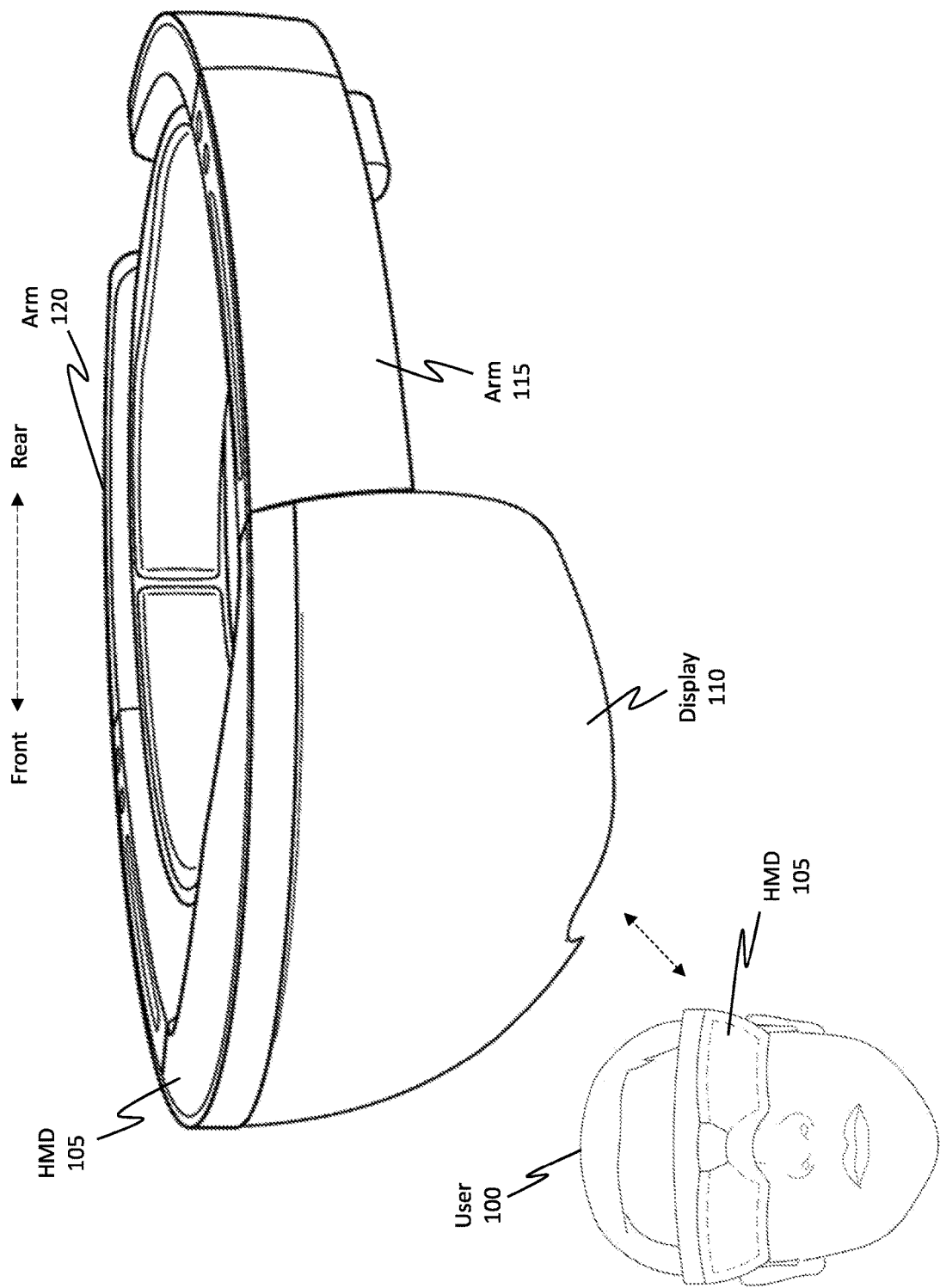
FIG. 1A illustrates an example head-mounted device (HMD) that can be placed on a user's head.

Embodiments disclosed herein relate to wearable head-mounted devices (HMD) whose circumference is dynamically adjustable to conform to different head sizes and head shapes. The HMD is also specially designed to improve functionality and aesthetics.

In some embodiments, the HMD includes a front-end and back-end housing, both of which include corresponding compute units. The HMD also includes two adjustable flex fit arms connecting the front-end housing to the back-end housing. Together, these structures define an enclosed rounded boundary that is placeable around a head of a user. The HMD also includes a nested flexible cable ribbon nested within a cavity extending along a length of either the first or second adjustable flex fit arm. The ribbon electrically couples the front and rear compute units and includes a static bend and a dynamic bend. The dynamic bend enables the nested flexible cable ribbon to effectively expand or contract in length (without stretching the ribbon's wires) as a circumference of the enclosed rounded boundary changes.

In some embodiments, the HMD also includes an adjustment wheel that, when turned, expands or contracts the circumference of the HMD. When this adjustment wheel is turned, then the circumference of the enclosed rounded boundary expands or contracts. Additionally, in some embodiments, the HMD includes multiple adjustment snaps. These snaps are embedded, or nested, within the cavity that extends along the length of the first or second adjustable flex fit arm.

Technical Benefits and Advantages

The disclosed embodiments can be used to solve many of the problems with the traditional technology. In particular, the disclosed embodiments are directed to a split HMD architecture in which the HMD's front-end housing includes some compute units and the HMD's back-end housing includes some other compute units. Splitting the architecture in this manner helps balance the weight distribution between the front and the back, thereby improving the user's comfort and experience with the HMD. Furthermore, structuring the HMD in this manner allows the user to avoid having to attach the split architecture portion to another part of the user's body (e.g., his/her belt or pocket).

Additionally, the disclosed embodiments improve the aesthetics of the HMD by embedding certain wiring, which connects the front end to the back end, directly inside of the HMD's adjustable flex fit arms. By embedding the wiring inside of the arms, the embodiments avoid having to place unsightly bundled cables on the outer, visible areas of the HMD.

Because the adjustable flex fit arms can be conformed to fit many different sizes and dimensions of heads (e.g., by bending, expanding, and contracting), the nested cables are also designed to be dynamically capable of conforming to the user's head. In fact, this new design allows for an almost unlimited number of different configurations, thereby allowing an unlimited number of users to enjoy the HMD. Accordingly, the disclosed embodiments are focused on an improved physical/hardware design for an HMD. This improved design not only improves the user's experience, but also ensure that the HMD operates efficiently (i.e. reduced latency while preventing wire stretch) and in an anticipated manner (e.g., by ensuring that a sufficient number of compute cycles are reliably passed from the back-end to the front-end, and vice versa).

As used herein, the terms "ribbon," "ribbon cable," "cable ribbon," "nested cable ribbon," and "nested flexible cable ribbon" are interchangeable with one another. A ribbon is a unit that includes any number of different conducting electrical wires running parallel to one another to form a flat plane. Consequently, the ribbon is typically flat and wide, yet can be long in length. In accordance with the disclosed principles, the embodiments position the wiring, which is used to connect the split HMD architecture compute units, inside the confines of the arms and, at certain selected locations within those arms, structure those wires in a ribbon-form.

As also used herein, the terms "arm," "adjustable flex fit arm," "adjustable arm," "flex fit arm," and "flex arm" are interchangeable terms. These terms relate to the connecting portions that connect the front-end housing to the back-end housing and that include the nested ribbon.

HMD Designs

Figure 1B:
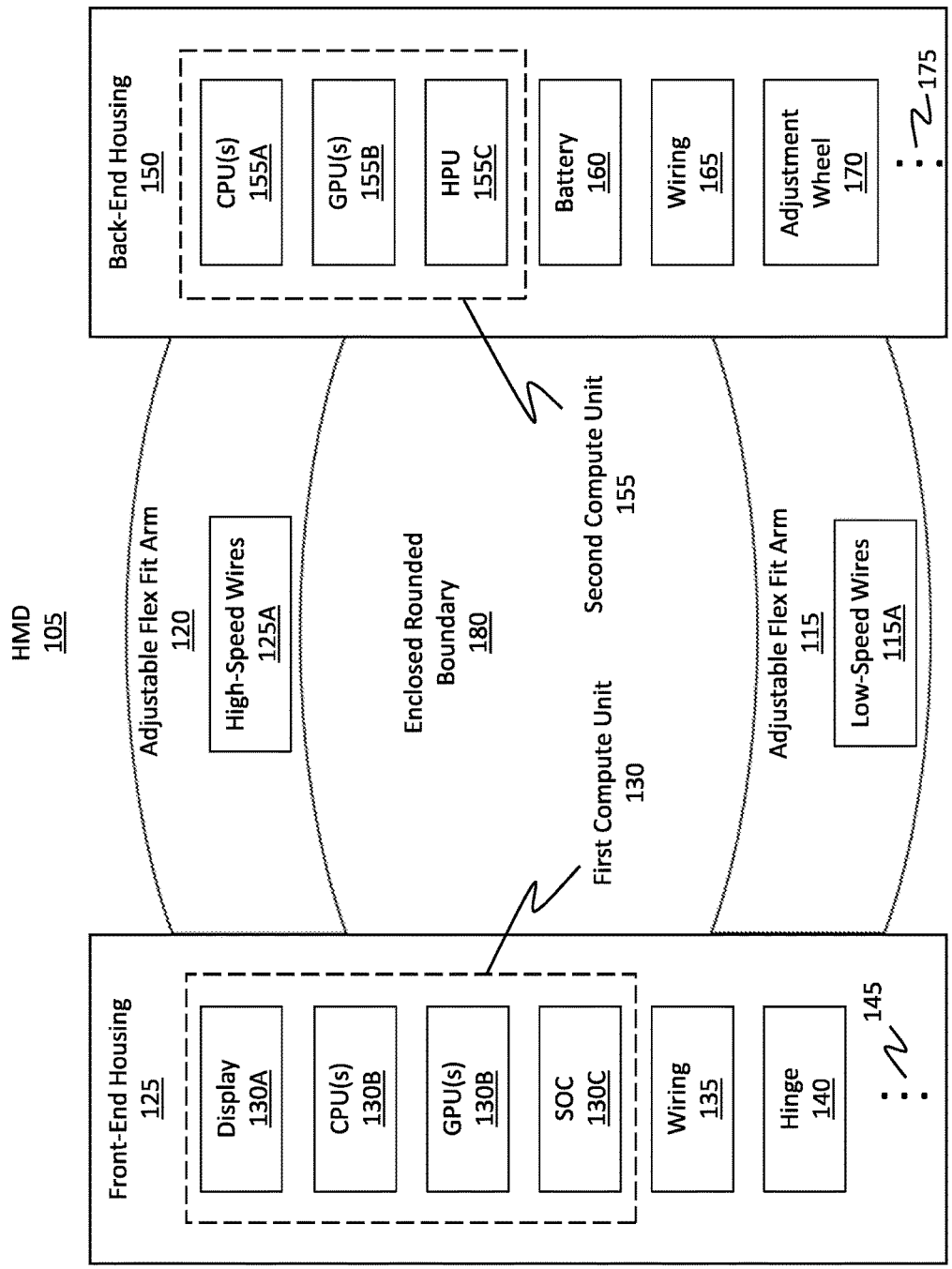
FIG. 1B illustrates another example HMD that includes a front-end housing, a back-end housing, and two adjustable flex fit arms.

Attention will now be directed to FIGS. 1A and 1B, which generally illustrate an example of an HMD that a user can wear to view and interact with an MR scene, as described earlier. Specifically, FIG. 1A shows a user 100 wearing an HMD 105. HMD 105 includes a display 110, a first arm 115, and a second arm 120. As shown, the display 110 is oriented towards the front of the HMD 105 so as to be positioned near the user's eyes.

It will be appreciated that display 110 can include any type of display. In some embodiments, display 110 includes a microelectromechanical scanning (MEMS) mirror display in which image pixels are individually rastered by a laser and mirror assembly. In other embodiments, display 110 includes any type of light-emitting diodes, plasma displays, liquid crystal displays, and so on. Accordingly, any type of display may be included within HMD 105, and the embodiments should not be limited to a particular type.

FIG. 1B shows an abstracted view of the HMD 105, using some abstracted block depictions to represent HMD components. It will be appreciated that these blocks are for example purposes only and should not be viewed literally as having block-like shapes.

HMD 105 includes a first adjustable flex-fit arm 115 (i.e. the same as in FIG. 1A) and a second adjustable flex-fit arm 120. The first adjustable flex fit arm 115 is shown as including any number of low-speed wires 115A while the second adjustable flex fit arm 120 is shown as including any number of high-speed wires 125A. Of course, the high-speed and low-speed wires can be positioned on either side of the HMD and are not limited to a specific side. Further detail on these wires will be provided later. Furthermore, it should be noted that these are the wires that are configured as ribbons and/or bundled cables discussed later.

The high-speed wires 125A can be used to transmit high-speed display data and/or sensor data (e.g., camera data, such as head tracking and depth detection) between the compute units located in the front-end housing and the compute units located in the back-end housing. These high-speed wires 125A are designed to have low latency, thereby enabling a high number of compute cycles or communications to be passed therethrough.

In contrast, the low-speed wires 115A can be used to provide power, ground (e.g., connections to a battery), or switching mechanisms. That is, in some cases, the low-speed wires 115A also include switches or signals that can operate at lower speeds as compared to the compute cycles of the high-speed wires 125A. As will be discussed in more detail later, the high-speed wires 125A can be configured in a first ribbon form while the low-speed wires 115A can be configured in a second ribbon form.

HMD 105 also includes a front-end housing 125, which includes a first compute unit 130, wiring 135, and a hinge 140. The ellipsis 145 is provided to illustrate how the front-end housing 125 may include additional components or structures as well (e.g., perhaps a front cushion or padding).

The first compute unit 130 is shown as including a number of different compute elements. Specifically, these compute elements include, but are not limited to, a display 130A (e.g., such as display 110 from FIG. 1A), one or more CPU(s) 130B (i.e. central processing units), one or more GPU(s) 130B (i.e. graphical processing units), and a SOC 130C (i.e. a system on chip). These compute elements/units are provided to render any number of virtual images for a user to view and interact with.

HMD 105 also includes a back-end housing 150, which includes a second compute unit 155, a battery 160, wiring 165, and an adjustment wheel 170. The ellipsis 175 demonstrates how any number of other compute elements, structures, or features may be included with the back-end housing 150. The first adjustable flex fit arm 115 connects the front-end housing 125 to the back-end housing 150, and the second adjustable flex fit arm 120 similarly connects the front-end housing 125 to the back-end housing 150.

The second compute unit 155 is shown as including one or more CPU(s) 155A, one or more GPU(s) 155B, and a holographic processing unit HPU 155C. As used herein, an HPU (e.g., HPU 155C) refers to a compute processing unit that obtains and integrates real-world data into an MR scene. In some cases, HPU 155C controls any number of inertial measurement units (IMU), head and hand tracking cameras, and depth cameras to generate a spatial mapping of the real-world environment. Using this spatial mapping, HMD 105 (and in particular HPU 155C) can cause holograms or virtual images to be projected for the user to view and interact with.

It will be appreciated that although SOC 130C is shown as being included in the front-end housing 125 and the HPU 155C is shown as being included in the back-end housing 150, the positions can be reversed. In other cases, both of the compute units can be included in the front-end housing 125 or both can be included in the back-end housing 150. Accordingly, FIG. 1B is provided to simply show one example implementation regarding the placement and configuration of some of the compute units of an HMD. Additionally, the battery 160 can also be positioned in the front-end housing 125 if so desired.

As will be described in more detail later, the adjustment wheel 170 is provided to enable the adjustable flex fit arms 115 and 120 to be adjusted to conform to a user's head size. For instance, the front-end housing 125, the back-end housing 150, the first adjustable flex fit arm 115, and the second adjustable flex fit art 120 define an enclosed rounded boundary 180 that is placeable around a user's head. In accordance with the disclosed principles, a circumference of this enclosed rounded boundary 180 can be dynamically (i.e. on demand) adjusted to fit an almost unlimited number of head shapes and sizes, as will be described in more detail later.

Figure 2:
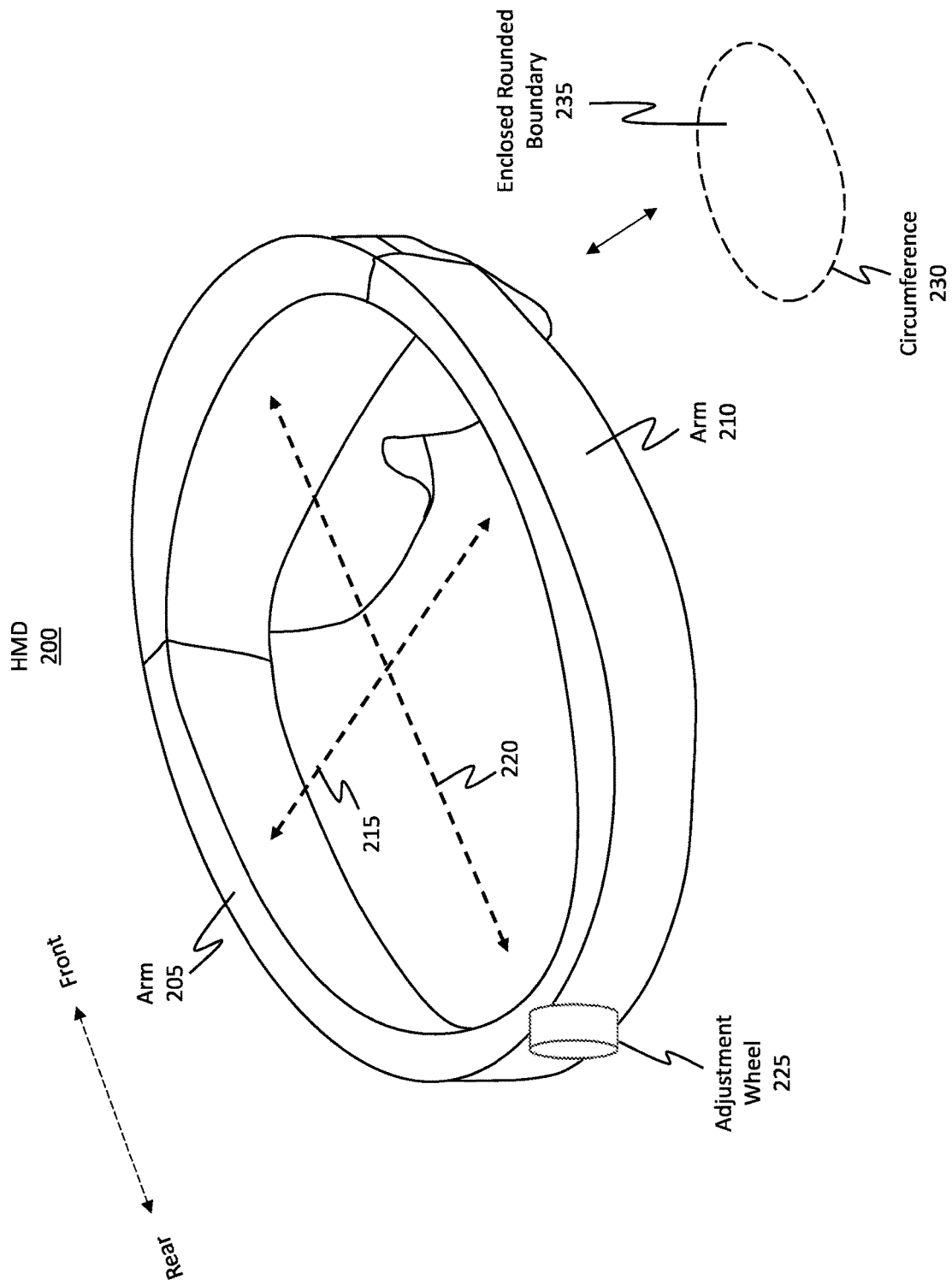
FIG. 2 illustrates how the HMD defines an enclosed rounded boundary that is "conformable" because the boundary can be expanded or compressed both longitudinally (e.g., front to back) or laterally (e.g., side to side) without necessarily changing the overall circumference of the boundary. That is, the headband can be squeezed or pulled apart without the overall circumference of the headband changing. Additionally, the disclosed embodiments enable the overall circumference of the headband to increase or decrease on demand.

FIG. 2 shows another HMD 200, which is an example implementation of HMD 105 from FIGS. 1A and 1B. Here, HMD 200 includes a first arm 205 and a second arm 210.

Because users have varying head sizes and shapes, it is desirable for HMD 200 to be able to be adjusted to fit those different head sizes and shapes. For instance, in some cases, HMD 200 can expand in a front/rear direction 220 (thereby bringing the sides closer to one another). In other cases, HMD 200 can expand in a side-to-side direction 215 (thereby bringing the front and rear sections closer to one another). In some cases, the lengths of the first and second arms 205 and 210 can be expanded or contracted via use of the adjustment wheel 225.

To clarify, the adjustment wheel 225 allows the first arm 205 and the second arm 210 to either more fully enter (i.e. recede into) the back-end housing (thereby reducing the circumference of HMD 200 to accommodate smaller heads) or more fully retract from the back-end housing (thereby increasing the circumference of HMD 200 to accommodate larger heads).

For instance, FIG. 2 shows the circumference 230 of HMD 200, where circumference 230 is defined by the front-end housing, back-end housing, and the two arms. This circumference 230 defines the enclosed rounded boundary 235, which is representative of the enclosed rounded boundary 180 of FIG. 1B. When the adjustment wheel 225 is turned, it causes the circumference 230 of the enclosed rounded boundary 235 to either expand or contract, thereby adjusting the size of HMD 200 (i.e. the size of the headband).

Figure 3:
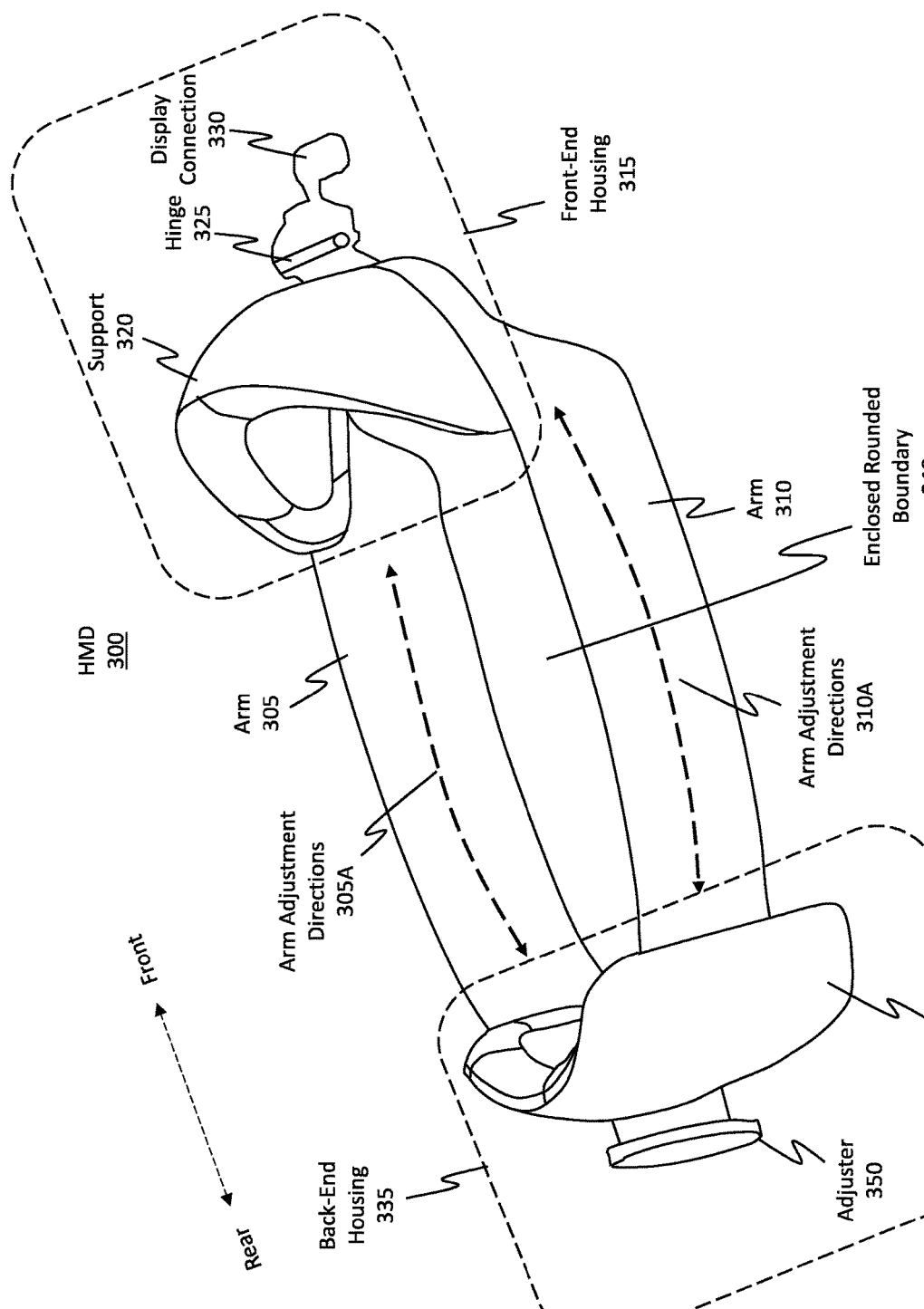
FIG. 3 illustrates another view of the HMD, and specifically illustrates how the adjustable flex fit arms can be adjusted to be expanded or contracted. Contraction occurs by the arms recessing further into the back-end housing while expansion occurs by the arms receding further out of the back-end housing.

FIG. 3 shows another view of HMD 300, which is representative of the HMDs discussed thus far. Here, HMD 300 includes an arm 305, which can be adjusted in arm adjustment directions 305A, and an arm 310, which can be adjusted in arm adjustment directions 310A. In this regard, the lengths of arms 305 and 310 can be expanded or contracted to suite smaller or larger sized user heads by receding from or retracting into a part of the HMD's rear section.

HMD 300 also includes a front-end housing 315, which is representative of the front-end housing discussed earlier. Front-end housing 315 includes, but is not limited to, a padded head support 320 (e.g., to provide padding against the user's head), a hinge 325, and a display connection 330. In some embodiments, the padded head support 320 may not be included or considered as a part of the front-end housing 315 but rather considered to be a separate part.

The display (e.g., display 110 from FIG. 1A) is not shown, but the display connection 330 is illustrated and can be used to physically couple the display to the HMD 300. That is, display connection 330 is an electrical connection that allows the display to be physically and electrically connected to the other portions of the HMD 300.

Hinge 325 allows the display to rotate upwards and downwards. For instance, in some embodiments, hinge 325 allows the display to rotate 60 degrees upward from its default lowered position so the display no longer immediately in front of the user's face. Of course, 60 degrees is just one example value. In other embodiments, the hinge 325 allows the display to rotate more (e.g., 70 degrees, 80 degrees, 90 degrees, etc.) or less (e.g., 55 degrees, 50 degrees, 45 degrees, etc.) relative to its default lowered position.

HMD 300 also includes a back-end housing 335, which is representative of the back-end housing portions discussed earlier. Together, the arms 305 and 310, the front-end housing 315, and the back-end housing 335 define an enclosed rounded boundary 340 through which the user can place his/her head to wear HMD 300.

The back-end housing 335 can include another padded head support 345 (e.g., to provide padding against the rear part of the user's head) and an adjuster 350, which is representative of the adjustment wheels 225 and 170, shown in FIGS. 2 and 1B, respectively. In accordance with the disclosed embodiments, at least a portion of arms 305 and 310 are disposed within the back-end housing 335. As the adjuster 350 is rotated (e.g., clockwise or counterclockwise), the arms 305 and 310 will either be pulled further into the back-end housing 335 (thereby contracting or reducing the circumference of HMD 300) or pushed further out of the back-end housing 335 (thereby enlarging or expanding the circumference of HMD 300). In some embodiments, adjuster 350 includes a ratchet mechanism that allows for the incremental adjustment of the circumference of HMD 300. Further details on how the circumference is modified will be provided later.

Figure 4:
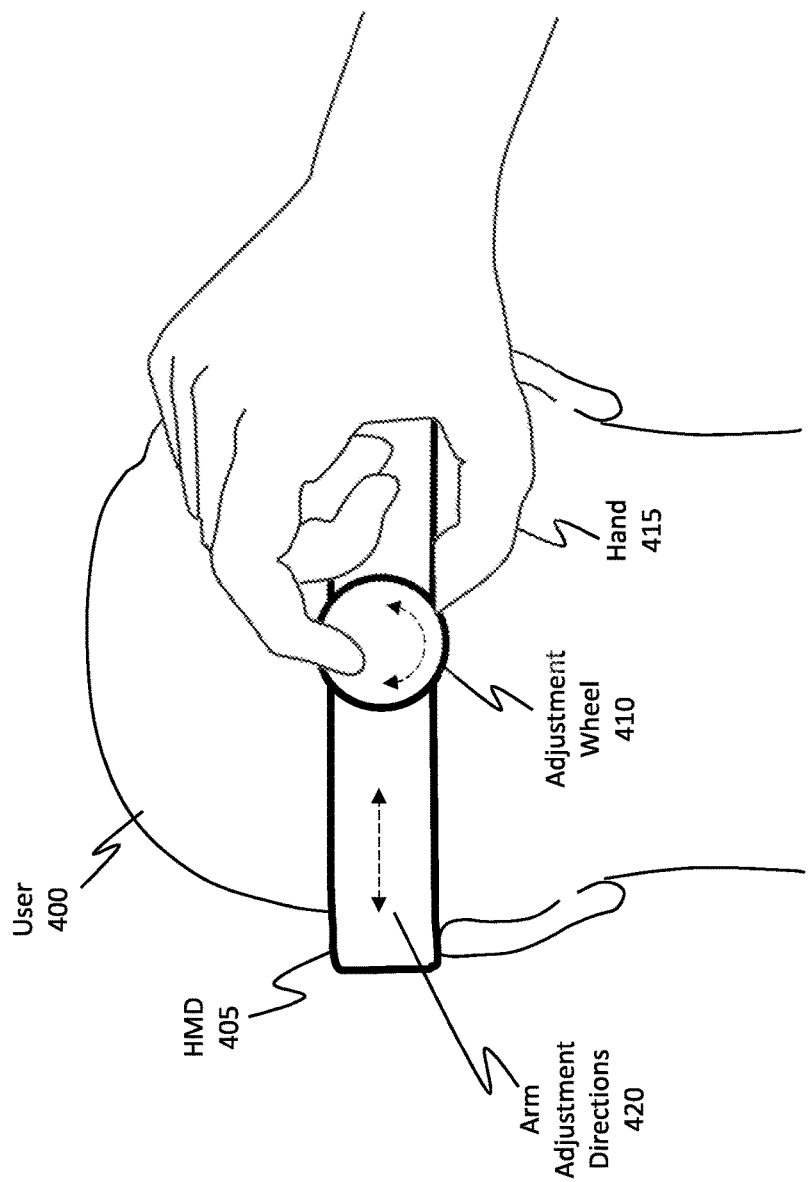
FIG. 4 illustrates an adjustment mechanism (e.g., an adjustment wheel) that, when turned/rotated, modifies the circumference of the enclosed rounded boundary (i.e. modifies the circumference of the headband).

FIG. 4 shows a user 400 and another HMD 405, which is representative of the HMDs discussed earlier. This figure also shows an adjustment wheel 410, which is representative of the adjusters and adjustment wheels discussed earlier. In this figure, the user's hand 415 is rotating the adjustment wheel 410 in either a clockwise or counterclockwise direction. Such rotations allow the size of the HMD 405 to either expand or contract in the arm adjustment directions 420.

The disclosed embodiments are highly configurable and can accommodate a wide variety of user head sizes and shapes. In some embodiments, the design criteria allow the disclosed HMDs to fit the $5^{th}$ percentile female head all the way up to the $95^{th}$ percentile male head.

The HMDs can fit across all types of ethnicities and head shapes. In some embodiments, the HMDs can fit youths as young as about 12 years old and adults aged over 100 years old. Some users' heads may have similar circumferences, but may have different lengths and widths. Because the HMD's arms can flex, the HMD is able to accommodate these different sizes. Some users also have different high points and pressure points. Notwithstanding, the disclosed HMDs can accommodate such features as well. Accordingly, not only can the circumference of the HMD be modified to fit different head sizes, but the circumference can remain substantially the same while allowing the arms to conform to different rounded shapes.

In some embodiments, the HMD's arms are initially molded to have a semi-circular, curved, arced, or rounded shape. In some cases, the initial molding is designed to be in the largest position possible. To clarify, if the HMD's circumference were expanded to be as large as possible, then the arms (according to this embodiment) will be in their natural molded position. As the HMD's circumference is reduced, then the arms are bent inwardly against their naturally molded position. Because the arms are naturally molded to a larger size, the amount of force required to contract the arms will be greater than the amount of force required to expand the arms (because the arms are under a spring-like tension). To clarify, during expansion, the arms will tend to exhibit a spring like force in which the arms are attempting to return to their naturally molded position.

In other embodiments, the arms can be molded in different default bends. For instance, the arms can be naturally molded to reflect a middle or mean position. In other embodiments, the arms can be molded to reflect a smallest possible position. Accordingly, the natural mold of the arms can vary depending on the design criteria.

Internals of the Adjustable Flex Fit Arm(s)

Figure 5:
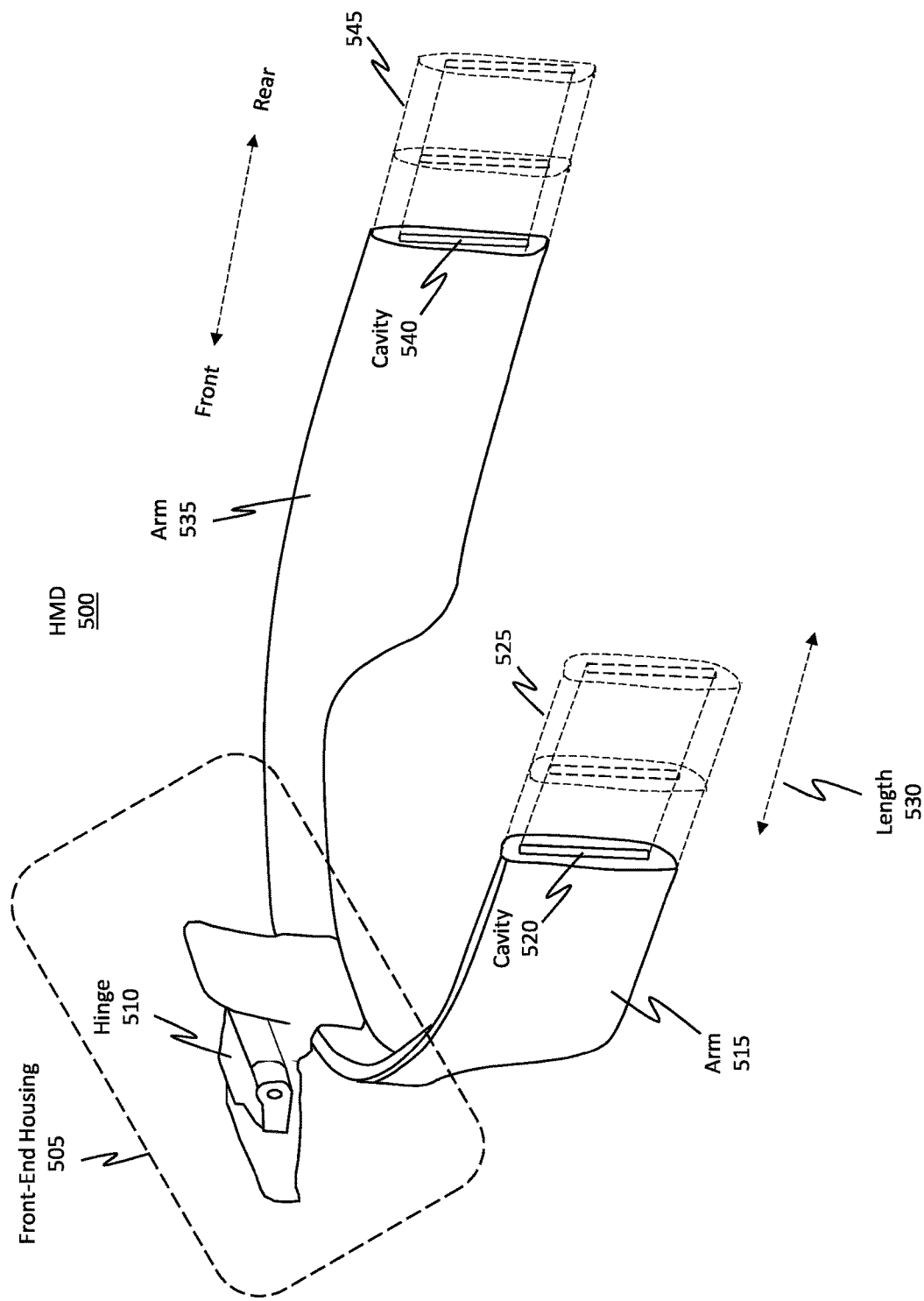
FIG. 5 illustrates a cut-away section of an HMD, where the cut-away section shows how corresponding cavities run through the lengths of both of the adjustable flex fit arms. Any number of components, such as speakers, cable ribbons, adjustment snaps, batteries, and compute units can be embedded or nested within this cavity.

FIG. 5 shows an HMD 500, which is again representative of the HMDs discussed earlier. As shown, HMD 500 includes a front-end housing 505 and a hinge 510, both of which are representative of the corresponding components discussed earlier.

HMD 500 also includes an arm 515. As will be discussed in more detail later, arm 515 is formed of at least two parts: an outer arm portion and an inner arm portion. These two portions are connected together to provide an almost seamless arm unit. The two portions are beneficially provided to allow for the conformal shape shifting that is required to suite the wide design criteria of being able to accommodate different head sizes and shapes. That is, the outer arm portion can bend and adjust independently and in a different manner than the inner arm portion, as will be discussed in more detail later.

Arm 515 can be formed of different materials, such as a hard-plastic substrate. In some cases, a molded rubber can be used or can even envelope the hard plastic. In some cases, padding is used to envelope the hard-plastic substrate.

Arm 515 is shown as including an inner cavity 520. Both the arm 515 and the cavity 520 extend 525 in a length 530 until the arm 515 reaches the back-end housing (not shown in this figure). Accordingly, FIG. 5 shows a cut-away illustration of the arm 515.

Cavity 520 is beneficially provided to allow different structures and compute units to be embedded or "nested" inside of arm 515. In this manner, the embodiments can avoid using unsightly bundled cables spanning the outside of the HMD. Instead, all of the wiring can be nested directly within the confines of arm 515.

Examples of the structures that can be nested within cavity 520 include, but are not limited to, adjustment snaps (e.g., to provide interconnection between the inner and outer arm portions or perhaps to provide incremental ratchet-like adjustment for the length 530 of arm 515 or even), wires, and even speakers. In some cases, additional compute units or batteries can even be provided within cavity 520.

FIG. 5 shows that HMD 500 includes another arm 535, which includes a similar cavity 540 extending 545 the length of the arm 535. In this regard, both of HMD 500's arms 515 and 535 can be used to house different nested structures. Furthermore, arms 515 and 535 can operate as a protective layer or housing for such structures.

Figure 6:
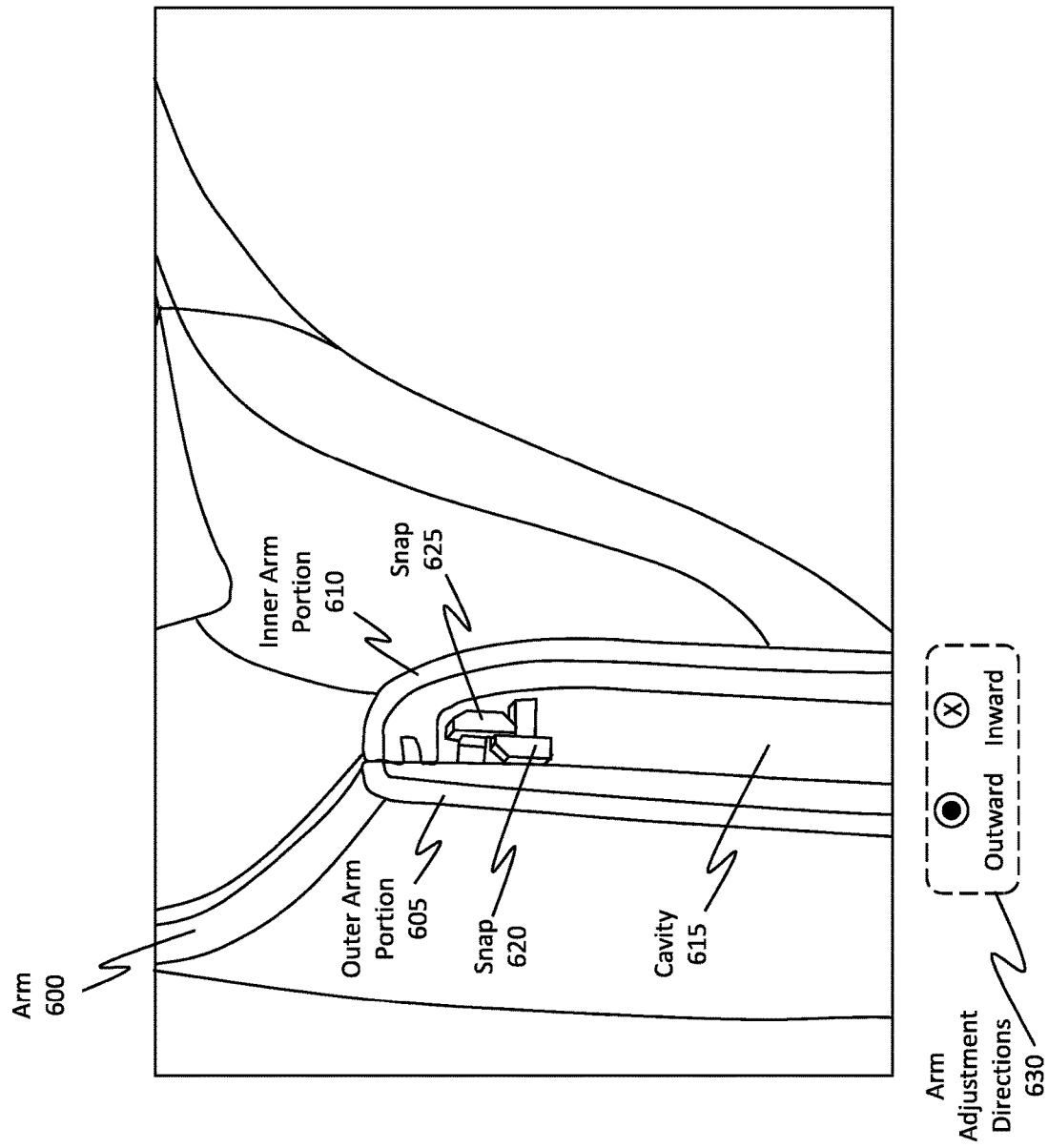
FIG. 6 illustrates another view of a cut-away portion of one of the adjustable flex fit arms.

FIG. 6 shows a close-up view of a cut-away section of the HMD's arm. Specifically, FIG. 6 shows a particular structure that can be included in an arm's cavity. For instance, FIG. 6 shows an arm 600, which is representative of either arm 515 or arm 535 from FIG. 5 or even any of the other arms discussed thus far.

Arm 600 is comprised of an outer arm portion 605 and an inner arm portion 610. These two arm portions are interlocked, hooked, or connected to each other to provide a seamless-looking arm unit.

Notably, however, the outer arm portion 605 can move independently of the inner arm portion 610. For instance, as the arm 600 is adjusted to larger or smaller sizes, the arm 600's arc length changes. To do so, the inner arm portion 610 can slide against the outer arm portion 605 to allow for increased flexibility of the arm 600 as a whole. That is, as compared to an arm formed of a single composite/homogenous unit, the arm 600 allows for a greater degree of flexibility because arm 600 is actually comprised of two separate, yet interconnected/hooked arm portions (which can slide or move relative to one another).

FIG. 6 shows how arm 600 includes a cavity 615, which is representative of cavity 520 and cavity 540 from FIG. 5. Nested within this cavity 615 is a plurality of snaps (e.g., snap 620 and snap 625). These snaps can be used, in part, to securely connect the inner and outer portions of the HMD's arms. In some cases, the snaps can also be used to incrementally control expansion or contraction of the circumference of the enclosed rounded boundary provided by the HMD.

Snap 620 is physically attached to the inner arm portion 610 while snap 625 is physically attached to the outer arm portion 605. Both of these snaps include a chamfer portion (i.e. a symmetrical sloping surface located near an edge). During assembly, the chamfers allow the two arm portions to be easily "snapped" together and subsequently restrained by the snaps. That is, the inner arm portion 610 and the outer arm portion 605 are snapped together via the snaps 620 and 625. Notably, arm 600 will include numerous snaps extending along its length. For instance, arm 600 may include 5, 6, 7, 8, 9, 10, 15, 20, 25, 30, or more than 30 snaps throughout its length.

The snaps (e.g., snaps 620 and 625) engage each other and allow for movement between the inner arm portion 610 and the outer arm portion 605, especially when the arm 600 is bent (e.g., during contraction or expansion of the HMD's circumference or when the headband's shape is conformed to a user's head). The snaps move or translate relative to one another, as shown by the arm adjustment direction 630.

With reference to FIG. 6, the snaps 620 and 625 can move inwardly into the page (as shown by the circled "x" indicator) or outwardly out of the page (as shown by the dark circle). Every snap included in the arm 600 can slide in or out in this manner. Depending on the position of a particular snap along the length of arm 600, the sliding/translating motion may be more or less than the sliding/translating motion of other snaps.

For instance, near the middle portion of the arm 600's length, the arm 600 may bend or flex relatively more than the outer terminal end portions of the arm 600's length. In these middle portions, the corresponding snaps may slide more than the snaps located near the terminal ends. Accordingly, different snaps may undergo different amounts of sliding/translating depending on their respective positions within the arm 600. It should be noted that both of the HMD's arms may include these snaps.

As described earlier, the HMD's arms are generally rounded, or shaped as an arc. It will be appreciated that the arc length of a curve (e.g., arm 600) changes as the curve bends. The outer portion of the curve will change differently than the inner portion. By providing separate arm portions (e.g., outer arm portion 605 and inner arm portion 610), the arm 600 will have an enhanced amount of flexibility and a reduced amount of rigidity during bending, flexing, or adjustment scenarios to enable for the dynamic size and configuration adjustment of the HMD. In contrast, a homogenous arm would not be able to bend nearly as easily.

Figure 7:
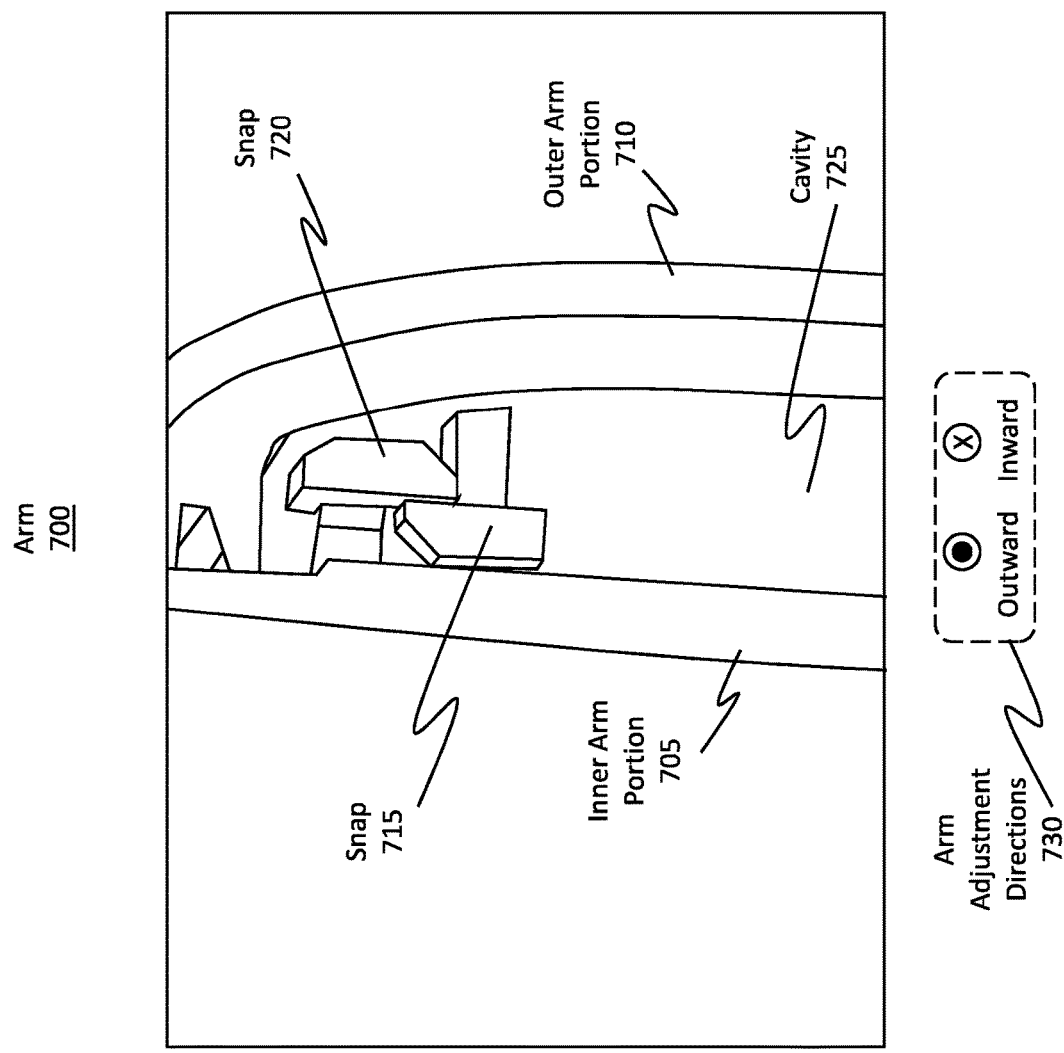
FIG. 7 illustrates a close-up view of a cut-away portion of the adjustable flex fit arm and a close-up view of the adjustable snap.

FIG. 7 shows a close-up view of the snap members, including the chamfers.

Specifically, FIG. 7 again shows an arm 700, which is representative of arm 600 from FIG. 6. Arm 700 includes an inner arm portion 705 that can slide, move, or translate relative to an outer arm portion 710, which is interconnected, or hooked, to the inner arm portion 705 through at least the use of snaps, such as snap 715 and snap 720. Arm 700 also includes a cavity 725 allowing for additional hardware structures to be nested within the confines of arm 700. Arm adjustment directions 730 show how the snaps 715 and 720 can translate or move relative to one another either into or out of the page when the arm 700 is flexed.

Front-End Housing Characteristics

Figure 8:
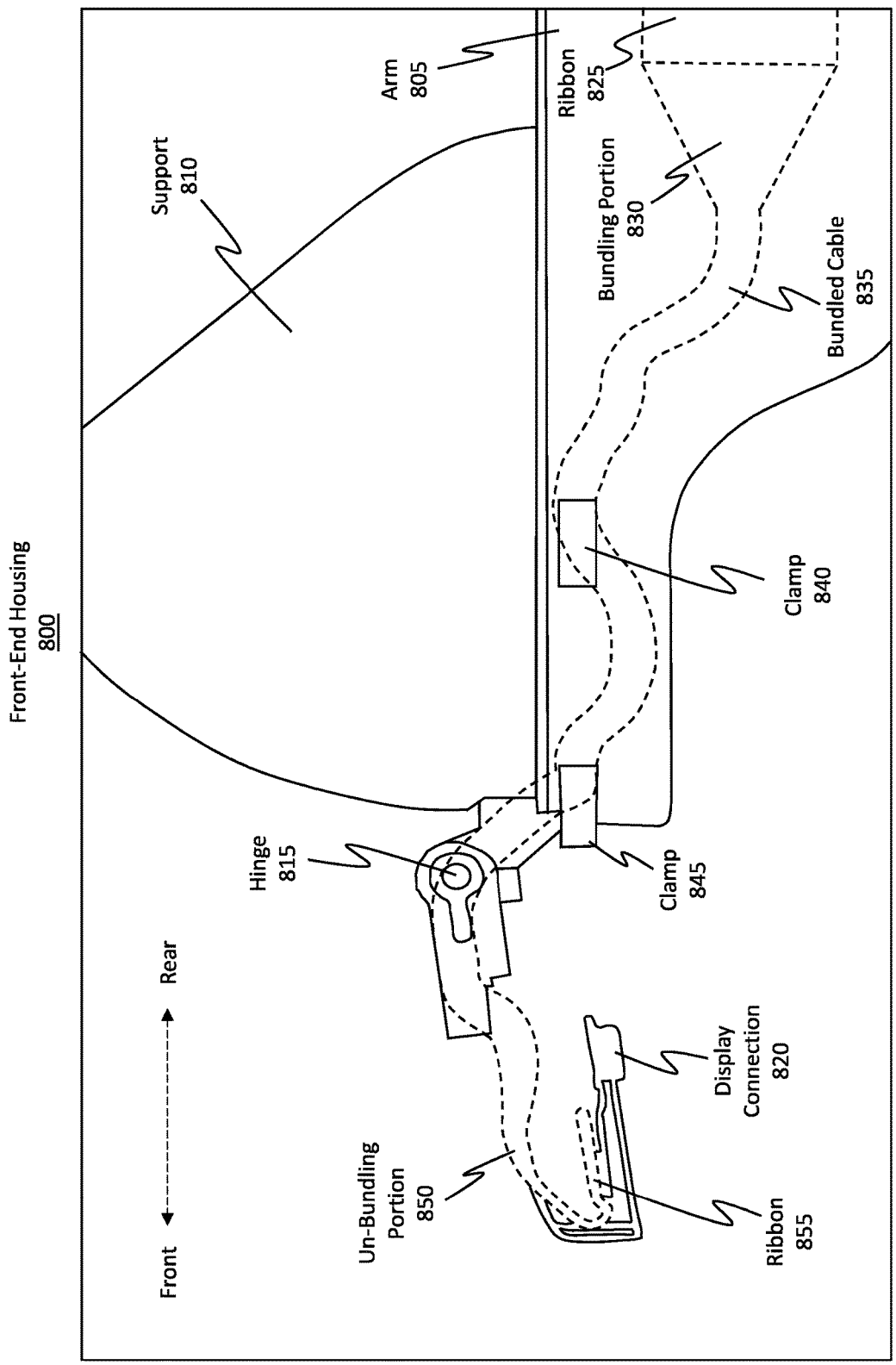
FIG. 8 illustrates how a nested flexible cable ribbon is nested within the HMD's arm.

Attention will now be directed to FIG. 8, which illustrates a front-end housing 800 as well as some of the physical structures that may be included in the front-end housing 800. For instance, front-end housing 800 is attached to an arm 805, which is representative of the arms discussed earlier. In some cases, front-end housing 800 includes or is associated with a padded head support 810 to increase the comfort levels of the user while the user wears the HMD.

Front-end housing 800 includes a hinge 815 configured to allow the HMD's display to pivot or rotate upwards and downwards. Such pivoting motion is beneficial because it enables the user to reposition the display out of the user's field of view without having to remove the HMD.

Front-end housing 800 can also include a display connection 820. Although the HMD's display is not illustrated in FIG. 8, the display can be physically and electrically connected to the HMD via the display connection 820.

The HMD also includes a nested cable ribbon 825, which is nested within the arm 805. Further details on this nested cable ribbon 825 and how it is structured will be provided later. In any event, FIG. 8 shows how the nested cable ribbon 825 begins to be bundled in or near the front-end housing 800 to form a bundling portion 830. That it, the wires included within the nested cable ribbon 825 are progressively bundled together to form a bundled cable 835. This bundled cable 835 then easily travels (e.g., because it can bend in all directions) through different portions of the front-end housing 800.

At different locations within the front-end housing 800, the bundled cable 835 is secured in place by one or more clamps, such as clamp 840 and clamp 845. Although only two clamps are illustrated, it will be appreciated that any number of clamps may be used. Accordingly, clamps 840 and 845 are provided to secure the bundled cable 835 in place within the front-end housing 800. Clamps 840 and 845 can be any type of clamping mechanism and are not limited to a specific type of clamp or fastener. Example types of clamps or fasteners include, but are not limited to, hinged locking clamps, compression cable clamps, vinyl or rubber coated clamps, steel cushion clamps, and so on.

FIG. 8 illustrates how the bundled cable 835 navigates throughout the front-end housing 800. In one section, the bundled cable 835 passes through the hinge 815 of the front-end housing 800. As illustrated, it is beneficial to position the bundled cable 835 to be as near the hinge 815's center/axis of rotation as possible. Positioning the bundled cable 835 near or at hinge 815's axis of rotation enables the bundled cable 835 to freely move with the movement of the hinge 815 while preventing the bundled cable 835 from bunching together during those movements. In this manner, the bundled cable 835 can pivot with the hinge 815 (e.g., anywhere between 45 degrees of rotation up to 90 degrees of rotation relative to the display's normal default lowered position).

After passing through hinge 815, the bundled cable 835 is then progressively unbundled at un-bundling portion 850 and eventually terminates as another cable ribbon 855. Cabled ribbon 855 may be connected to the display connection 820 for connecting to the display.

Accordingly, within the front-end housing 800, some of the HMD's electrical wires transition between various states. In one location on the HMD, the electrical wires are in the form of a nested cable ribbon. In another section, the electrical wires are bundled to form a bundled cable. This bundled cable passes through the front-end housing, and in particular passes through a hinge. Then, at yet another section, the electrical wires are un-bundled to again be structured as a cable ribbon.

Figure 9:
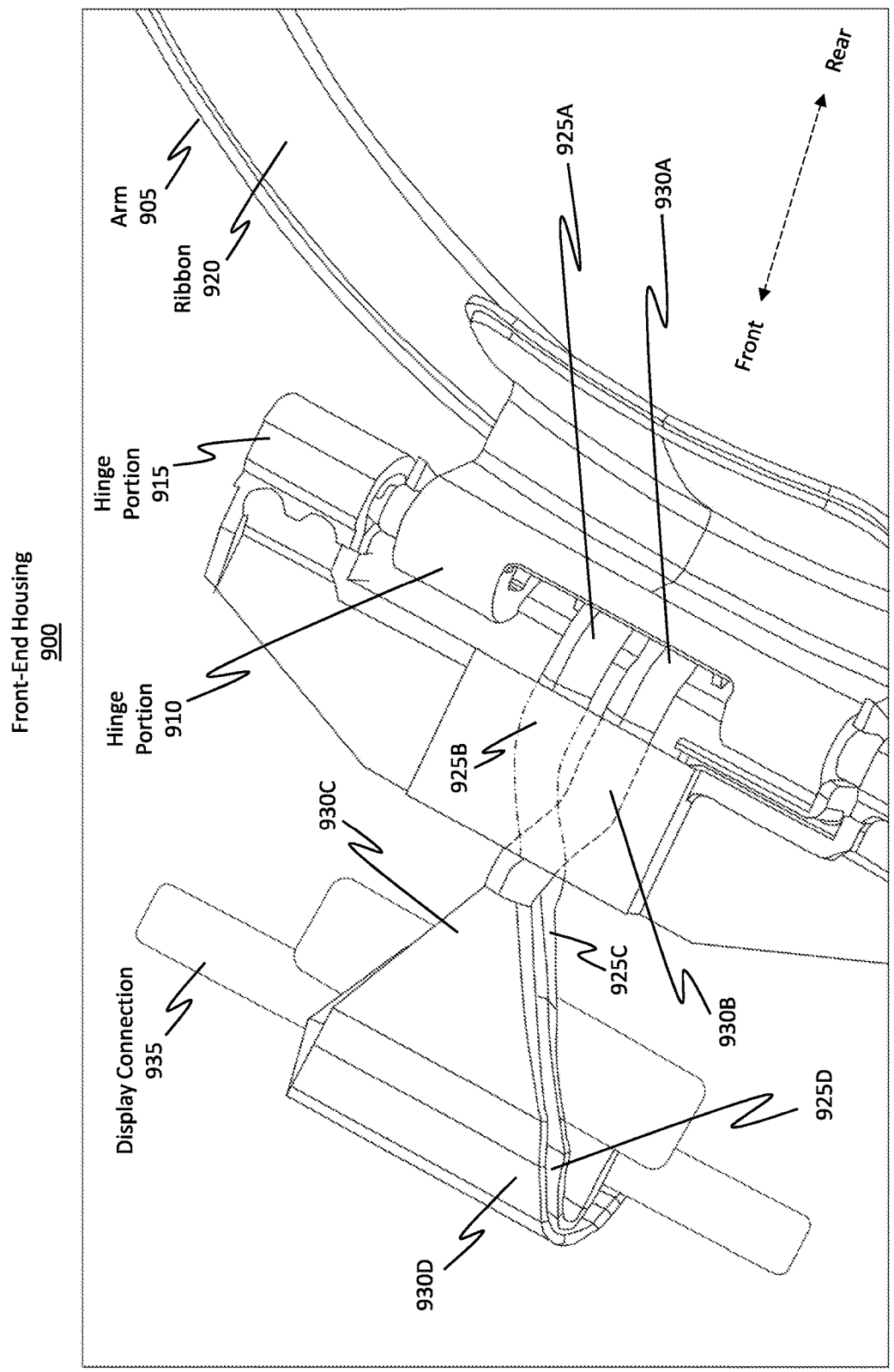
FIG. 9 illustrates how the bundled cable travels through the hinge and then is un-bundled to again form a ribbon.

FIG. 9 provides a close-up view of a part of the front-end housing 900, which is representative of the front-end housing 800 of FIG. 8. More particularly, FIG. 9 shows an arm 905 connected to the front-end housing 900. FIG. 9 also more clearly shows the hinge. Specifically, front-end housing 900 includes a first hinge portion 910, which is an integral part of the front-end housing 900, and a second hinge portion 915, which is connected to the first hinge portion 910 via a pivot pin (not illustrated). Via the pivot pin, these two hinge portions allow the display section to be physically connected to the HMD and to undergo pivoting movement.

FIG. 9 also shows how a ribbon 920 is nested within the arm 905. To clarify, FIG. 9 shows a view of arm 905 where the inner arm portion has been removed, thereby enabling ribbon 920 to be viewable. Under normal operation, arm 905 will include both an outer arm portion and an inner arm portion. The ribbon 920 will be sandwiched, enveloped, or surrounded by these two arm portions, thus the ribbon 920 will not be visible. In this scenario, however, the inner arm portion has been removed to allow the ribbon 920 to be visible.

As described earlier, the electrical wires in the ribbon 920 are then bundled to form a bundled cable. The labels 925A, 925B, 925C, and 925D provide visual reference points for the electrical wires as they pass through the front-end housing 900. For instance, label 925A shows how the electrical wires pass through the hinge, and in particular shows how the wires pass through the axis of rotation of that hinge. Label 925B is a subsequent portion of the electrical wires immediately prior to those wires being un-bundled or fanned out, as shown by label 925C. At label 925D, the electrical wires are now structured in the form of a cable ribbon, as described earlier.

FIG. 9 also shows how multiple different bundled cables and cable ribbons can be included in the system. Specifically, in some embodiments, each arm of the HMD includes a separate nested cable ribbon that electrically couples the front-end housing 900 to a back-end housing (not shown in FIG. 9). For instance, one ribbon may include high-speed wires while the other ribbon may include low-speed wires, as described earlier. The labels 930A, 930B, 930C, and 930D provide visual reference points for a second set of electrical wires as they pass through the front-end housing 900.

To illustrate, label 930A shows a bundled cable, which was previously bundled from a cable ribbon nested within a different arm (i.e. not arm 905 but rather the other arm which is not currently shown). At label 930A, the bundled cable to disposed near or at the hinge's axis of rotation.

Label 930B is a subsequent portion of the electrical wires immediately prior to those wires being un-bundled or fanned out, as shown by label 930C. At label 930D, the electrical wires are now structured in the form of a cable ribbon.

As shown in FIG. 9, in some embodiments, two separate bundled cables can initially run parallel to one another (e.g., at labels 925A and 930A). Subsequently, those two bundled cables can actually cross over one another (e.g., the section between labels 925B and 925C and between labels 930B and 930C), resulting in the labels now being vertically on top of one another. As the electrical wires fan out to form the cable ribbons, the electrical wires can now be disposed in a stacked manner, with one set of wires being positioned overtop of the other set. In this manner, the cable ribbons can also be positioned in a stacked manner, as shown in FIG. 9. Eventually, those two cable ribbons terminate and connect to the display connection 935.

Figure 10:
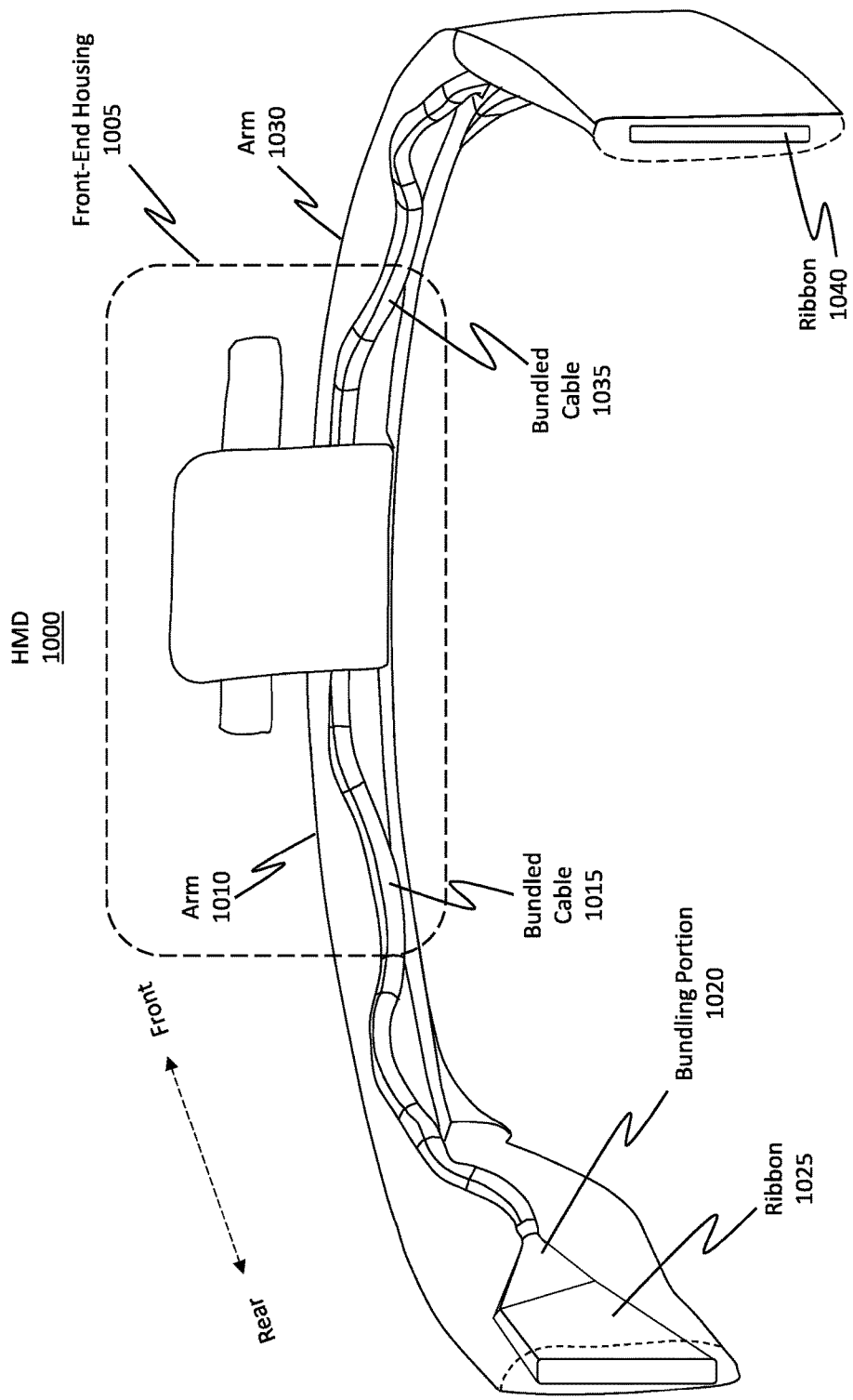
FIG. 10 illustrates an internal view of the HMD's arms and how different ribbons extend through the lengths of the arms.

FIG. 10 provides another perspective of an HMD 1000, which is representative of the HMDs discussed thus far. HMD 1000 includes a front-end housing 1005, just like front-end housing 900 of FIG. 9. HMD 1000 also includes arm 1010, with a bundled cable 1015 passing therethrough in accordance with the manner described earlier. At a different segment of arm 1010, the electrical wires are bundled together at the bundling portion 1020 where they are structured as a nested cable ribbon 1025.

HMD 1000 includes another arm 1030, with a bundled cable 1035 passing therethrough in accordance with the techniques described earlier. Similarly, arm 1030 also includes a nested cable ribbon 1040. Accordingly, the HMD 1000 includes two arms (e.g., arm 1010 and arm 1030), with each arm having a corresponding set of electrical wires passing through the internal confines, or rather the internal cavities, of those arms, as described earlier in connection with FIG. 5 (e.g., cavities 520 and 540).

Nested Cable Ribbon Characteristics

Figure 11:
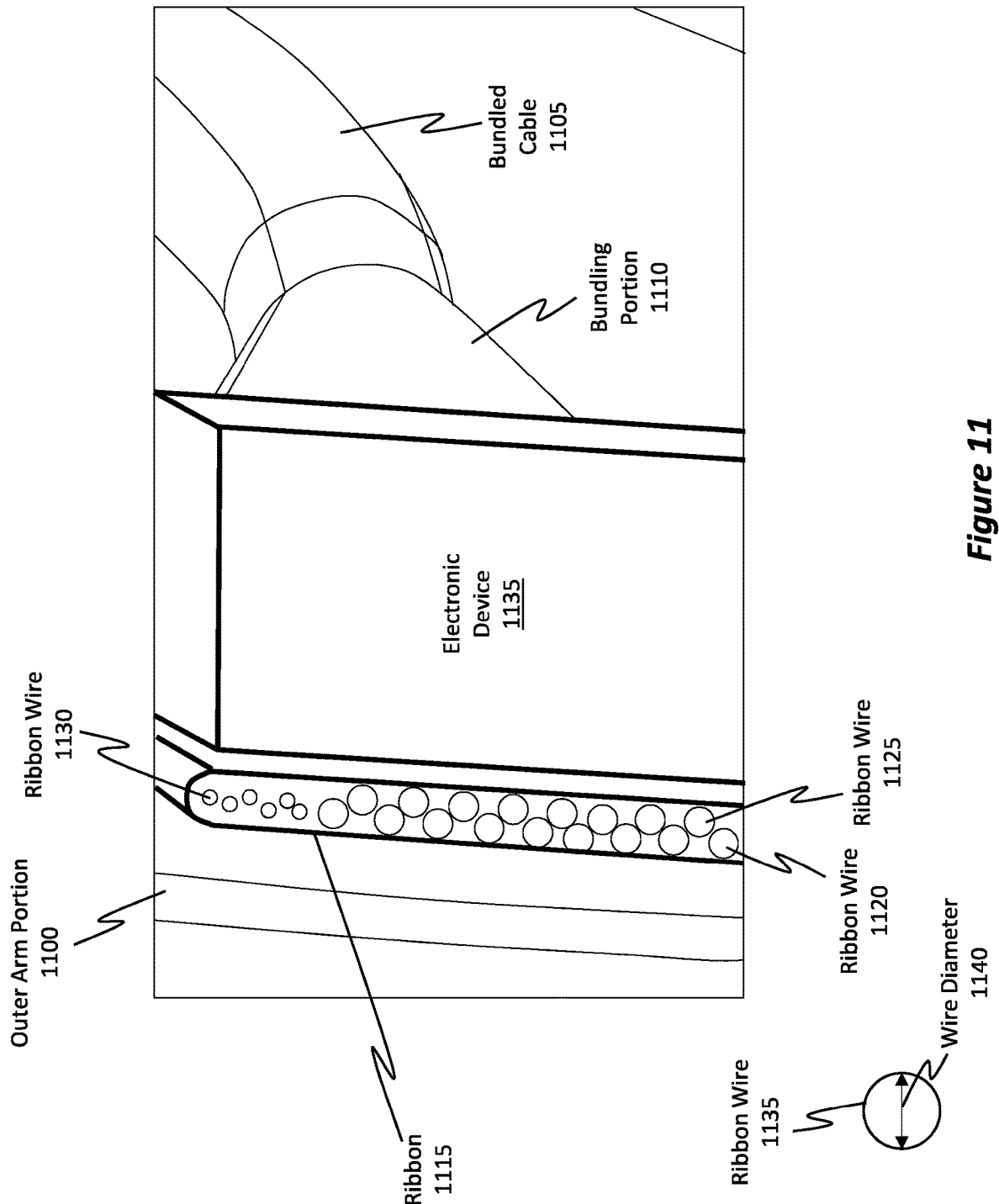
FIG. 11 illustrates a close-up cut-away view of the nested cable ribbon.

FIG. 11 shows an outer arm portion 1100 of an HMD arm (e.g., arm 1010 from FIG. 10). In this example scenario, the inner arm portion is not illustrated. FIG. 11 also shows a bundled cable 1105, which is representative of bundled cable 1015 from FIG. 10, and bundling portion 1110, which is representative of bundling portion 1020 from FIG. 10. FIG. 11 also shows a nested cable ribbon 1115, which is representative of nested cable ribbon 1025 of FIG. 10.

As shown, the nested cable ribbon 1115 is oriented in a generally vertical direction relative to the page (i.e. the ribbon runs parallel to the height of the arms), with the electrical wires (e.g., ribbon wire 1120, ribbon wire 1125, and ribbon wire 1130) being generally stacked one on top of the other. For instance, with reference to FIG. 5, the arms 515 and 535 are shown as having a height extending vertically, where the cavities 520 and 540 are taller than they are wider. As such, the electrical wires will also be oriented in a vertical or height direction.

In some cases, the electrical wires (e.g., ribbon wire 1135, which symbolically represents the wires included in the ribbon) in the nested cable ribbon 1115 all have the same wire diameter 1140. In other embodiments, however, the wire diameter 1140 can be different for different wires. For instance, FIG. 11 shows that ribbon wire 1125 has a different wire diameter than ribbon wire 1130. Accordingly, the nested cable ribbon 1115 can be configured in different manners with different size or gauge wires.

In some embodiments, the nested cable ribbon 1115 can be positioned proximately to another electronic device 1135 disposed within the arm's cavity. For instance, electronic device 1135 can be a speaker, a processor, a GPU, an HPU, a battery, or any other electrical component. Electronic device 1135 may occupy a short length within the arm or it may occupy a longer length within the arm. The length of the electronic device 1135 may impact the bendability or flexibility of the arm, so the length can be set to any desired dimension in order to improve the arm's flexibility.

Figure 12:
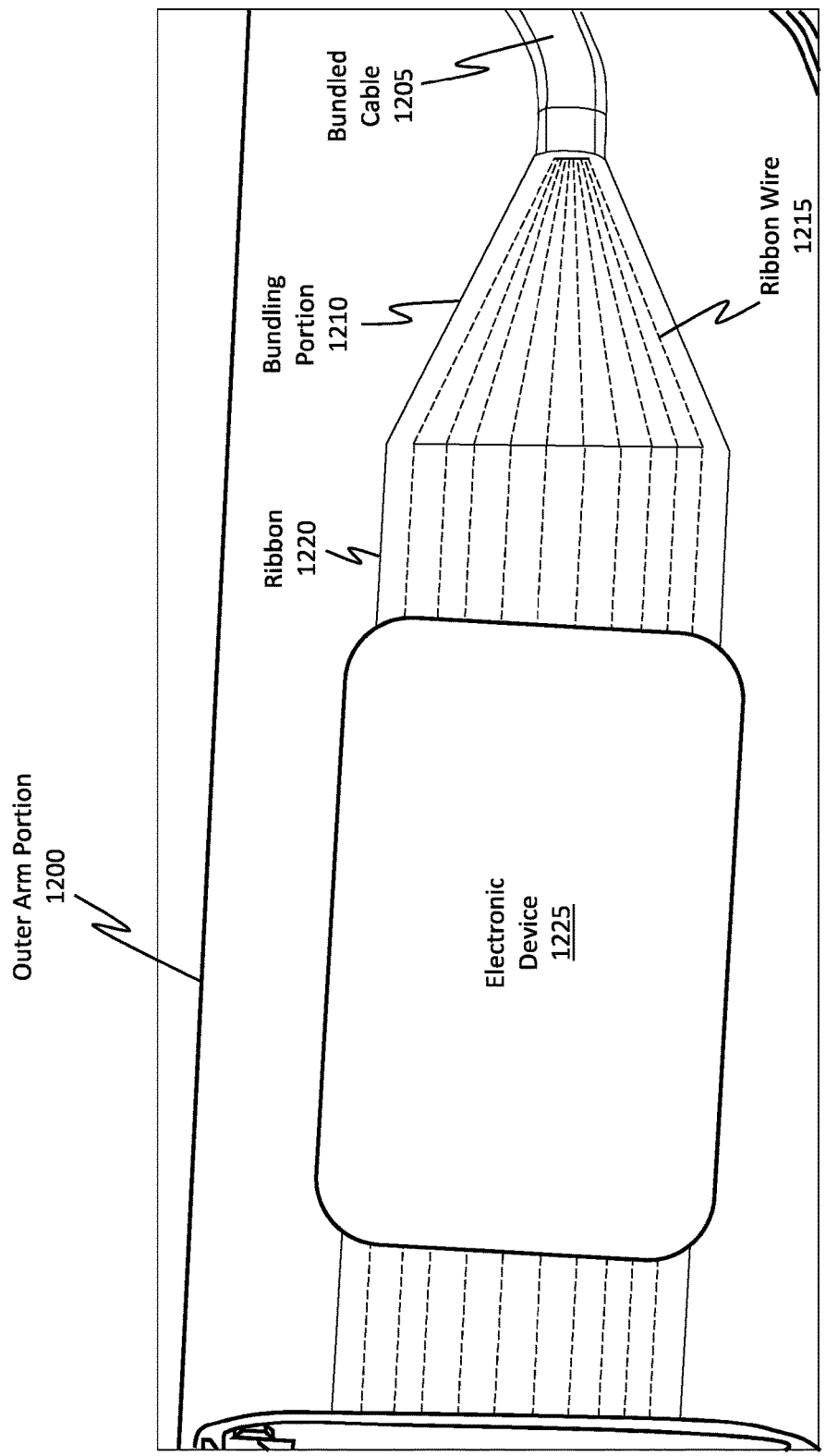
FIG. 12 illustrates another view of the nested cable ribbon nested within an adjustable flex fit arm. In some cases, the ribbon can be positioned proximately to another electronic device (e.g., a speaker).

FIG. 12 illustrates another perspective of how a nested cable ribbon can be included within the HMD's arms. In particular, FIG. 12 shows an outer arm portion 1200, similar to the one shown in FIG. 11. Also shown are a bundled cable 1205, a bundling portion 1210, ribbon wire 1215, a nested cable ribbon 1220, and an electronic device 1225. Here, the nested cable ribbon 1220 is shown as being located on an outer side (i.e. a side closer to an outer region of the HMD's circumference) of the electronic device 1225. In situations where the electronic device 1225 is a speaker, such a configuration is beneficial because the speaker will be closer to the user's ear and the nested cable ribbon 1220 will not impede the resulting sound. In other situations, however, the nested cable ribbon 1220 can be disposed on an inner side (i.e. a side closer to an inner region of the HMD's circumference) of the electronic device 1225.

It will be appreciated that the electrical wires included within the nested cable ribbon 1220 will travel the length of the HMD's arm, from the front-end housing to the back-end housing. Furthermore, because the arms are designed to be flexible to allow them to be conformed to a user's head, the embodiments beneficially orient the nested cable ribbon 1220 in a perpendicular orientation relative to the arm's bending direction and parallel to the arm's height direction.

That is, the electrical wires are stacked within the nested cable ribbon 1220 in a manner so that the arms can be easily bent without significant resistance from the wires bending. By stacking the wires perpendicularly to the bending direction, the arm will be able to bend better than if the wires were bundled together as a cable or if the wires or bundled in another configuration. That is, although a bundle of wires can bend in all directions, the force required to bend the bundle of wires is higher than the force required to bend a ribbon of wire (provided the bend is perpendicular to the flat surface).

To further clarify, the arm essentially includes a vertical wall of wires stacked one on top of the other. When stacked in this vertical arrangement, each wire can move and bend as a unified plane of wires, where the plane's thickness is only about the size of the wire's diameter/gauge, which imparts significantly less bending resistance as compared to a bundled cable. In this regard, the nested flexible cable ribbon includes a plurality of parallel cables or wires that are substantially disposed within a same flat pane. The nested flexible cable ribbon can, therefore, be oriented perpendicularly relative to a plane defined by the HMD's enclosed rounded boundary. Furthermore, because the arms will likely be bent a large number of times (e.g., each user will adjust the HMD to fit his/her head), the user's experience will be improved because adjusting the HMD's size will be easier with the nested cable ribbon.

Nested Cable Ribbon Bending to Improve Arm Size Adjustment

As described throughout this disclosure, the embodiments are directed to an improved type of HMD that allows the HMD's arms to conform to essentially any person's head size and shape. To do so, the HMD's arms can be pulled more fully into the HMD's back-end housing (thus tightening the HMD, or rather reducing the HMD's circumference) or, alternatively, the arms can be pushed more fully out of the HMD's back-end housing (thus increasing the HMD's circumference) via the adjustment wheel (e.g., adjustment wheel 225 from FIG. 2).

Figure 13:
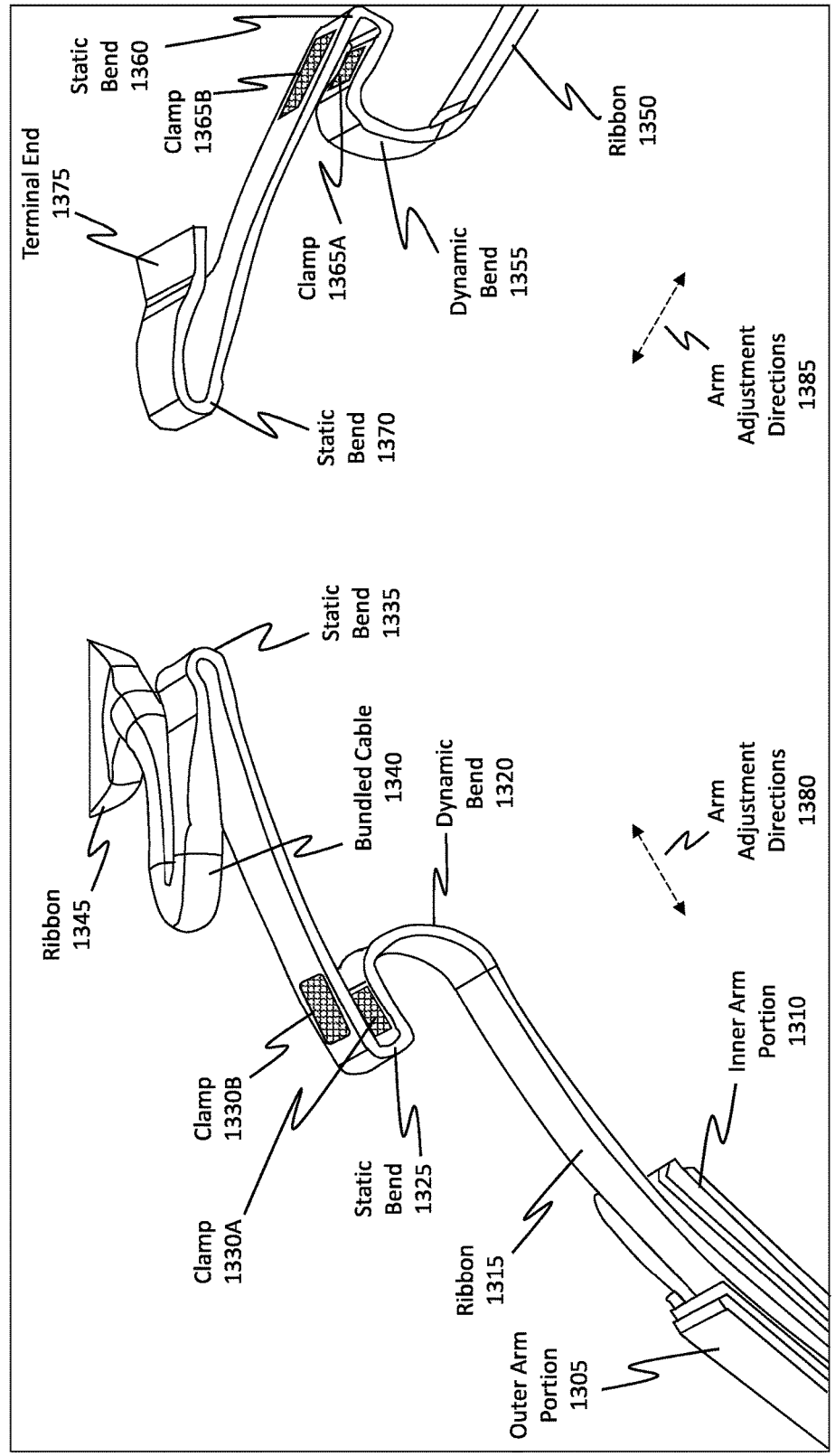
FIG. 13 illustrates some components that can be included in the back-end housing, which includes a portion of the nested cable ribbon. Furthermore, within the back-end housing, the nested cable ribbon is structured to include both a static bend and a dynamic bend.
Figure 14:
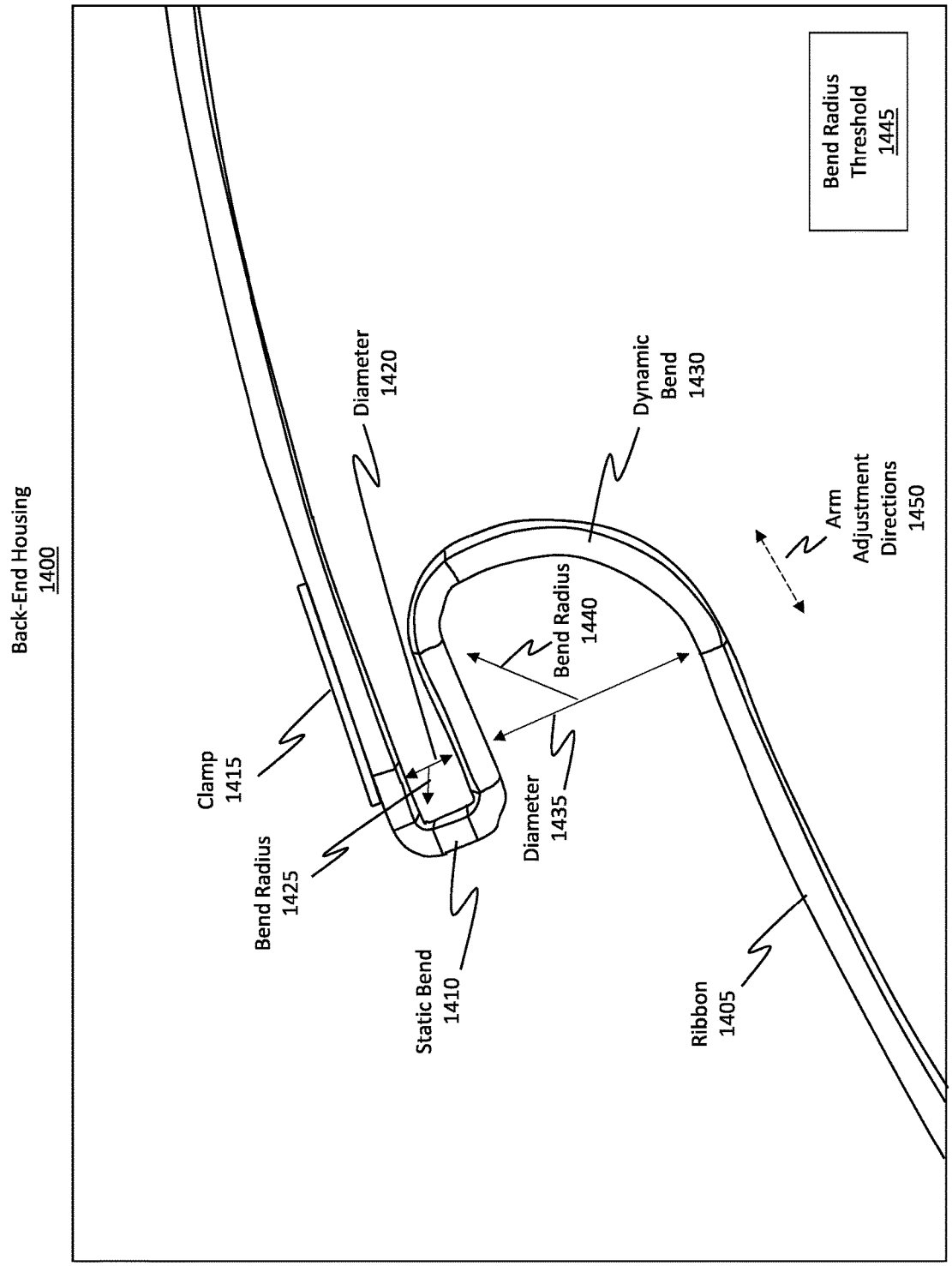
FIG. 14 provides a close-up view of the static bend and the dynamic bend.

Because wires are nested within the internal confines of the HMD's arms, it is desirable to structure the wires in a manner that allows for the improved HMD flexibility. FIGS. 13 and 14 will now be used to illustrate an improved configuration for the HMD's wires to allow for the HMD's arms to be dynamically adjustable, both in terms of length (i.e. for different head sizes) and in terms of bending flexibility (i.e. for conforming purposes to suite different head shapes) without causing the wires to be stretched.

FIG. 13 shows some portions of the back-end housing 1300, or rather some portions that are inserted into the back-end housing 1300. Initially, FIG. 13 shows an arm that includes an outer arm portion 1305 and an inner arm portion 1310, configured in the manners described earlier. Nested within the internal confines of the arm (i.e. the cavity between the outer arm portion 1305 and the inner arm portion 1310) is a nested cable ribbon 1315. In this regard, the nested cable ribbon 1315 (i.e. a nested flexible cable ribbon) is nested within the arm's cavity, which extends along a length of the corresponding arm (e.g., either a first adjustable flex fit arm or a second adjustable flex fit arm).

FIG. 13 shows various cut-out illustrations of these structures. In actual implementation, the arm portions will extend more fully into the back-end housing 1300. The nested cable ribbon 1315 electrically couples the compute units located in the front-end housing to the compute units located in the back-end housing 1300.

To enable the dynamic effective lengthening or shortening of the arms, the disclosed embodiments structure the nested cable ribbon 1315 in a particular manner. Specifically, the nested cable ribbon 1315 includes a dynamic bend 1320 in which the nested cable ribbon 1315 folds entirely back on itself, as shown in FIG. 13 (i.e. the nested cable ribbon 1315 bends 180 degrees). Additionally, the nested cable ribbon 1315 includes a static bend 1325 in which the nested cable ribbon 1315 again folds back on itself (i.e. again bends 180 degrees). Together, the dynamic bend 1320 and the static bend 1325 cause the nested cable ribbon 1315 to be shaped in a generic "S" like shape (thereby bending 360 total degrees). The dynamic bend 1320 enables the nested cable ribbon 1315 to effectively expand or contract as the circumference of the HMD changes, without causing the wires to stretch.

For example, as the HMD's circumference increases (corresponding to a scenario in which the arms are pushed out more fully from within the back-end housing 1300), the dynamic bend 1320's bend radius will decrease, thereby permitting the length of the nested cable ribbon 1315 to effectively become larger, thus accommodating the larger HMD circumference.

In contrast, as the HMD's circumference decreases (corresponding to a scenario in which the arms are pulled in more fully within the back-end housing 1300), the dynamic bend 1320's bend radius will increase, thereby permitting the length of the nested cable ribbon 1315 to effectively become smaller, thus accommodating the smaller HMD circumference. Further details on the bend radius will be provided later.

In contrast to the movements of the dynamic bend 1320, the static bend 1325 is secured in place, thereby preventing the nested cable ribbon 1315 from moving at the location of the static bend 1325. In some embodiments, one or more clamps, such as clamp 1330A and 1330B, may be used to securely fasten the nested cable ribbon 1315 in place to prevent movement at the static bend 1325. In this regard, one or more clamp(s) may be disposed proximately to the static bend 1325, where these clamps operate to clamp the nested cable ribbon 1315 in place to prevent it from flexing at the static bend 1325.

In some embodiments, the nested cable ribbon 1315 includes yet another static bend 1335 located relatively closer to the terminal end as compared to the static bend 1325. Similar to the wires included in the front-end housing, the electrical wires included in the nested cable ribbon 1315 can transition from being formed as a ribbon, to being formed as a bundled cable 1340, and then back to being formed as a ribbon 1345.

The other arm may be configured in a similar manner. For instance, on the right-hand side of FIG. 13, there is shown another nested cable ribbon 1350, which is nested within the opposite arm to the arm shown on the left-hand side of the figure. Nested cable ribbon 1350 includes a dynamic bend 1355 and a static bend 1360, both of which operate in a manner similar to dynamic bend 1320 and static bend 1325, respectively. Similarly, one or more clamps (e.g., clamps 1365A and 1365B) may be used to secure the nested cable ribbon 1350 in place to prevent it from flexing at the static bend 1360. Even further, another static bend 1370 may be provided along with a terminal end 1375.

Arm adjustment directions 1380 and arm adjustment directions 1385 illustrate the directions in which the arms can be adjusted to accommodate different head sizes. As shown, when the arms are adjusted in the arm adjustment directions 1380 and 1385, the nested cable ribbons 1315 and 1350 can dynamically move to lengthen or shorted their effective lengths at dynamic bends 1320 and 1355.

FIG. 14 provides a closer view of the dynamic and static bends that were described in FIG. 13. Here, FIG. 14 again illustrates some structures that may be included in a back-end housing 1400. In particular, FIG. 14 shows a nested cable ribbon 1405 that includes a static bend 1410 in which the nested cable ribbon 1405 folds back on itself (e.g., 180 degrees). Also shown is a clamp 1415 that is used to secure the nested cable ribbon 1405 in place to prevent the nested cable ribbon 1405 from moving at the static bend 1410. One or more additional clamps may be used as well.

In this illustration, the static bend 1410 is shown as having a bend diameter 1420 and a bend radius 1425. Consequently, the nested cable ribbon 1405 folds back on itself at the bend radius 1425 (e.g., a "first" bend radius). Because the nested cable ribbon 1405 does not move at the static bend 1410, the bend radius 1425 can be might tighter or smaller as compared to the bend radius of the dynamic bend.

FIG. 14 also shows that the nested cable ribbon 1405 includes a dynamic bend 1430 in which the nested cable ribbon 1405 folds back on itself (e.g., another 180 degrees). Here, the dynamic bend 1430 has a diameter 1435 and a bend radius 1440 (i.e. a "second" bend radius). Consequently, the nested cable ribbon 1405 folds back on itself at the bend radius 1440.

In accordance with the disclosed embodiments, the bend radius 1440 is required to be larger than the bend radius 1425. Furthermore, the bend radius 1440 is required to be larger than a minimum bend radius threshold 1445. The arm adjustment directions 1450 illustrate the directions in which the arm can be adjusted to either increase or decrease the circumference of the HMD.

By allowing the electrical wires to retain their ribbon shape through the dynamic bend 1430 and the static bend 1410, it is possible to minimize the service loop bend radius of those wires and to increase their flexibility, thereby allowing the HMD to be adjusted more easily. To clarify, in order to reliably and repeatedly pass a certain number of compute cycles through a wire, that wire's bend radius either needs to be a static value or, alternatively, (if the bend is dynamic as a result of moving) the bend radius should be a value that is not below a particular minimum threshold (e.g., the minimum bend radius threshold 1445).

Such criteria are beneficial because the properties of the wire (e.g., the resistance or impedance) change as the wire is shaped in different manners. The tighter a wire is bent while undergoing movement (i.e. at the dynamic bend 1430), the less compute cycles will be able to pass through that wire due to the stress placed on the wire and the changes to resistance/impedance (especially for high-speed compute cycle scenarios).

Therefore, by configuring the wires in a ribbon form, it is possible to reduce the bend radius to a minimum value while still enabling a desired number of compute cycles to pass therethrough. Furthermore, it should be noted that because the wires at the static bend 1410 are not moving (i.e. they are not under movement stress), using a relatively tighter bend radius at that location will not adversely impact the number of compute cycles that can pass therethrough. Accordingly, the dynamic bend 1430 enables the nested cable ribbon 1405 to expand or contract as the circumference of the HMD (e.g., the enclosed rounded boundary 235 in FIG. 2) changes.

Bend Radius Characteristics

In some embodiments, the dimension or size of the bend radius 1440 is at least twice a dimension of the bend radius 1425. In some embodiments, the relative size is even larger. For instance, the relative size difference can be 2.5 times, 3 times, 3.5 times, 4 times, 4.5 times, 5 times, 5.5 times, 6 times, or more than 6 times.

In some embodiments, the minimum bend radius threshold 1445 is at least 6 times a diameter (e.g., wire diameter 1140 from FIG. 11) of the wire included within the nested cable ribbon 1405. In some embodiments, the minimum bend radius threshold 1445 is 6.5 times larger than the wire's diameter, or 7 times, 7.5 times, 8 times, and so forth.

In some embodiments, the minimum bend radius threshold 1445 (e.g., corresponding to the bend radius 1440 of the dynamic bend 1430) is at least 3 millimeters (mm). In other implementations, the minimum bend radius threshold 1445 is at least 3.5 mm, 4.0 mm, 4.5 mm, 5.0 mm, 5.5 mm, 6.0 mm, or larger than 6.0 mm. In some implementations, the minimum bend radius threshold 1445 is between 3 mm and 20 mm, and the bend radius 1440 actually changes within that range (but not to exceed the limits) as the HMD's circumference changes. That is, the bend radius 1440 changes as the circumference of the enclosed rounded boundary (e.g., enclosed rounded boundary 235 from FIG. 2) changes. Notably, however, the minimum bend radius threshold 1445 is never less than 3 mm such that the bend radius 1440 is also never less than 3 mm, even though it changes when the headband is bent (e.g., between 3 mm and 20 mm).

Because the bend radius 1440 is larger than the bend radius 1425, it is often the case that the bend radius 1425 (corresponding to the static bend 1410) is less than 3 mm. Accordingly, in some embodiments, the bend radius 1425 (i.e. a "first" bend radius) is less than 3 mm and the bend radius 1440 (i.e. a "second" bend radius) is more than 3 mm. In some embodiments, the bend radius 1425 can be larger than 3 mm, but the reduced size is beneficial to help compact the assembly unit.

In some embodiments, the flexibility of the arms is greater nearer the back-end housing as compared to the flexibility of the arms nearer the front-end housing. This may occur, at least in part, due to other hardware elements (e.g., speakers) being located in the arms in areas nearer to the front-end housing.

Figure 15:
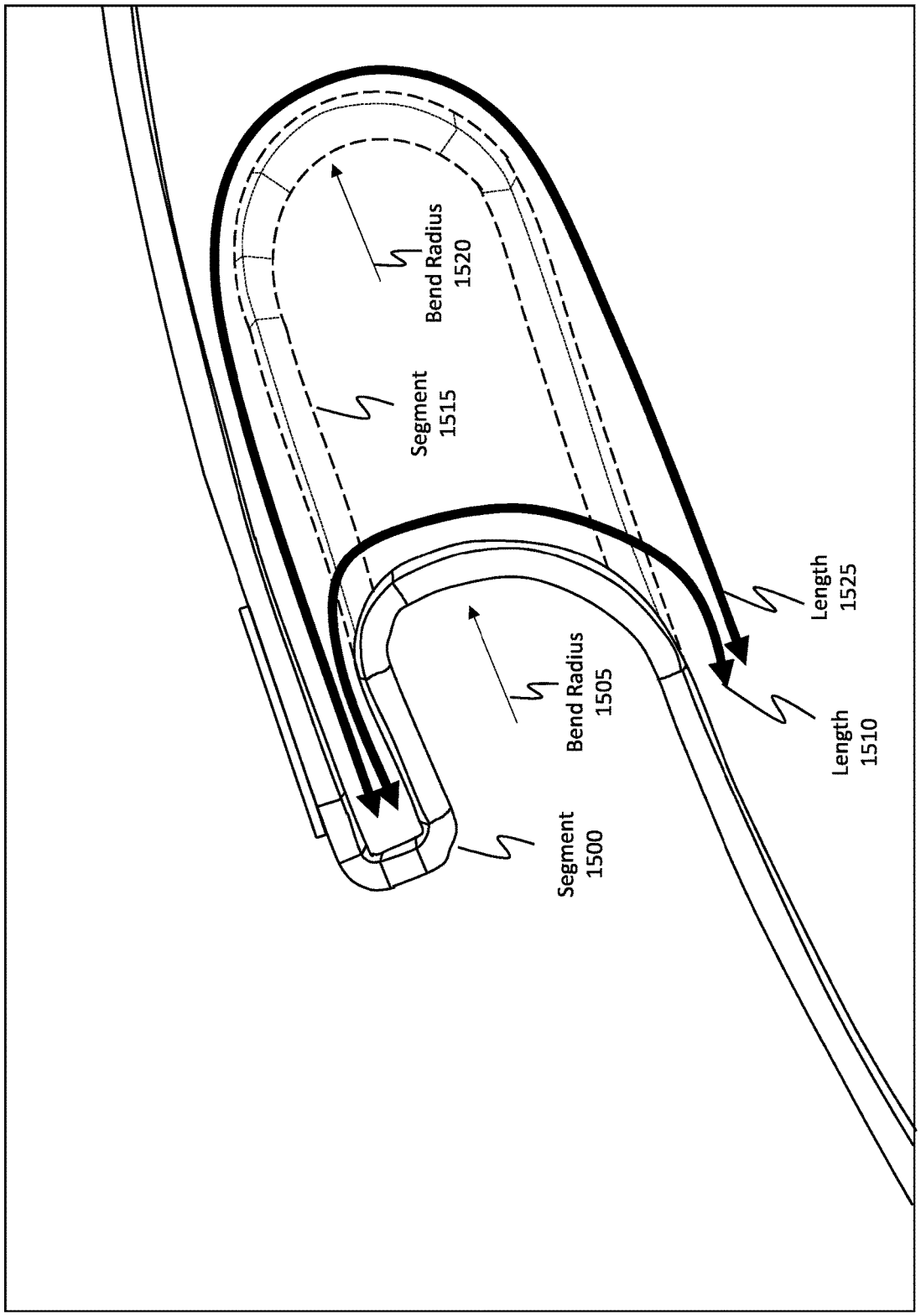
FIG. 15 illustrates how the nested cable ribbon's effective length can change to accommodate different head sizes.

FIG. 15 again shows a nested cable ribbon. Segment 1500 illustrates the nested cable ribbon at one state in time. Here, segment 1500 has a bend radius 1505 and a length 1510 that defines the length of the nested cable ribbon throughout the dynamic bend. As the HMD's headband is adjusted to fit different head sizes, the length 1510 throughout the dynamic bend will change. That is, as the circumference of the headband is made larger, then the length 1510 will become shorter. As the circumference of the headband is made smaller, then the length 1510 will become longer.

For instance, segment 1515 shows the nested cable ribbon at a state in which the headband's circumference has been made smaller such that the nested cable ribbon is retracted more fully inside of the back-end housing. Here, segment 1515 includes a bend radius 1520 and a length 1525 defining the length of the nested cable ribbon throughout the dynamic bend. As shown, length 1525 is larger than length 1510 because the circumference of the headband has been made smaller (thereby causing a larger portion of the nested cable ribbon to wrap or fold in on itself).

In some cases, even though length 1510 and 1525 may be different, the bend radius 1505 and bend radius 1520 may remain substantially the same value. That is, the bend curvature of the dynamic bend may remain substantially the same. In other cases, the bend radii may be different.

It will be appreciated that the lengths 1510 and 1525 may be set to any value to satisfy the design criteria of the adjustable headband (e.g., to support different head sizes). In some embodiments, the lengths 1510 and 1525 may be as short as $2*\pi/2$ (because the bend represents only a half circle as opposed to a full circle), where "r" is the minimum bend radius threshold 1445. Such a value will result in an absolute smallest amount for the length (and perhaps corresponding to the absolute largest headband circumference because the nested cable ribbon is being pulled as tightly as permitted). In the case where "r" does equal the smallest threshold value (e.g., 3 mm), then the absolute minimum value for lengths 1510 and 1525 would be about 18.8 mm.

In some embodiments, the lengths 1510 and 1520 may be much larger, extending up to 30 mm, 40 mm, 50 mm, 60 mm, 70 mm, 80 mm, 90 mm, 100 mm, 150 mm, 200 mm, 250 mm, 300 mm, 350 mm, 400 mm, 450 mm, 500 mm, and more than 500 mm. These longer lengths correspond to scenarios in which the headband is adjusted to a smaller size, thereby resulting in a larger amount of nested cable ribbon folding back on itself within the back-end housing.

Accordingly, the disclosed embodiments relate to devices that nest a flexible cable ribbon within a headband of an HMD to interconnect non-contiguous processing units. More specifically, the flexible cable ribbon interconnects processing units (e.g., a graphics processing unit) disposed within the front-end housing with other processing units (e.g., a central processing unit) located within a rear or back-end housing of the HMD. Of course, the ribbon can connect other hardware elements as well (e.g., a battery). The HMD's headband is configured to vary in rigidity at different portions. For instance, the headband may be relatively more flexible at areas closer to the back-end housing as compared to areas closer to the front-end housing. As such, the arms can provide a variable amount of flexibility spanning their lengths.

Accordingly, in some embodiments, the headband includes a front portion (e.g., the front-end housing) that has a first rigidity, a side portion (e.g., an arm) having a second rigidity that is less than the first rigidity, and a rear portion (e.g., the back-end housing) having a third rigidity that is greater than the second rigidity. In some embodiments, as described above, the rigidity of the arms can also be different at different legs, segments, or areas of the arm.

The flexible cable ribbon nested within an arm includes multiple discrete sections that progress from inside the back-end housing, through the headband arms, and ultimately into the front-end housing. The different sections include varying configurations and properties to enable the headband to conform to many different head shapes and sizes. For instance, a first section of the flexible cable ribbon begins in the back-end housing. This first section includes a plurality of individual data cables that are tightly bundled together to provide flexibility in multiple planes. Each of the individual data cables is a finely stranded cable/wire to ensure maximum flexibility.

A second section of the flexible cable ribbon transitions from the tight bundle, which is flexible in multiple planes, to a thin ribbon that is flexible only in a single plane. Within the second section, the flexible cable ribbon is folded back multiple times to allow for shortening and elongation of the headband with respect to the back-end housing. Such a configuration allows for a user to tighten or loosen the headband, which changes the relative position of the processing unit(s) in the back-end housing to the processing unit(s) in the front-end housing (e.g., effectively bringing them closer to or farther from one another).

A third section of the flexible cable ribbon extends in ribbon form through the length of the headband's arms until reaching the front-end housing. A fourth section of the flexible cable ribbon transitions from the thin ribbon back into another tight bundle, which is now flexible in multiple planes. This tight bundle enters a rigid portion of the headband and curves within the headband around the user's brow. The tight bundle ultimately exits the headband and enters the front-end housing in which it is connected to another processing unit (e.g., the GPU). In some embodiments, the fourth section passes through an axis of a hinge mechanism that allows the front-end housing to be tilted up out of the user's immediate view. Accordingly, certain low-speed wires and high-speed wires, which may be included in respective nested flexible cable ribbons nested within respective cavities of the HMD's arms, can be used to transmit low-speed signals (or power) or high-speed signals, respectively.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted device (HMD) whose circumference is dynamically adjustable to conform to different head sizes and head shapes, the HMD comprising:
   a front-end housing that includes a first compute unit;
   a back-end housing that includes a second compute unit;
   a first adjustable flex fit arm connecting the front-end housing to the back-end housing;
   a second adjustable flex fit arm connecting the front-end housing to the back-end housing, wherein the front-end housing, the back-end housing, the first adjustable flex fit arm, and the second adjustable flex fit arm define an enclosed rounded boundary that is placeable around a head of a user; and
   a nested flexible cable ribbon nested within a cavity extending along a length of either the first adjustable flex fit arm or the second adjustable flex fit arm, wherein:
     the nested flexible cable ribbon electrically couples the first compute unit to the second compute unit,
     the nested flexible cable ribbon includes a static bend that is secured in place such that a section of the nested flexible cable ribbon forming the static bend is prevented from flexing at the static bend, and in which the nested flexible cable ribbon folds back on itself at a first bend radius, and
     the nested flexible cable ribbon includes a dynamic bend in which the nested flexible cable ribbon folds back on itself at a second bend radius, which is larger than the first bend radius and which is larger than a minimum bend radius threshold, the dynamic bend enabling the nested flexible cable ribbon to expand or contract as a circumference of the enclosed rounded boundary changes.

2. The HMD of claim 1, wherein the first compute unit is one of a central processing unit (CPU), a graphics processing unit (GPU), a holographic processing unit (HPU), or a system on chip (SOC).

3. The HMD of claim 1, wherein the second compute unit is one of a central processing unit (CPU), a graphics processing unit (GPU), a holographic processing unit (HPU), a system on chip (SOC).

4. The HMD of claim 1, wherein the nested flexible cable ribbon includes high-speed wires that transmit high-speed display data.

5. The HMD of claim 4, wherein a second nested flexible cable ribbon is nested in a second cavity extending along a second length of the other one of the first adjustable flex fit arm or the second adjustable flex fit arm, and wherein the second nested flexible cable ribbon includes low-speed wires that transmit low-speed signals and/or power.

6. The HMD of claim 1, wherein the HMD further includes an adjustment wheel that, when turned, expands or contracts a circumference of the enclosed rounded boundary.

7. The HMD of claim 1, wherein the HMD further includes a plurality of adjustment snaps nested within the cavity, the adjustment snaps being structured to incrementally control expansion or contraction of the circumference of the enclosed rounded boundary.

8. The HMD of claim 1, wherein a clamp is disposed proximately to the static bend, the clamp clamping to the nested flexible cable ribbon to prevent the nested flexible cable ribbon from flexing at the static bend.

9. The HMD of claim 1, wherein a dimension of the second bend radius is at least twice a dimension of the first bend radius.

10. The HMD of claim 1, wherein the minimum bend radius threshold is at least 6 times a diameter of a wire included in the nested flexible cable ribbon.

11. The HMD of claim 1, wherein the static bend is secured in place by one or more clamps such that the section of the nested flexible cable ribbon forming the static bend is prevented from flexing at the static bend via use of the one or more clamps.

12. A head-mounted device (HMD) whose circumference is dynamically adjustable to conform to different head sizes and head shapes, the HMD comprising:
   a front-end housing that includes a first compute unit;
   a back-end housing that includes a second compute unit;
   a first adjustable flex fit arm connecting the front-end housing to the back-end housing;
   a second adjustable flex fit arm connecting the front-end housing to the back-end housing,
   wherein the front-end housing, the back-end housing, the first adjustable flex fit arm, and the second adjustable flex fit arm define an enclosed rounded boundary that is placeable around a head of a user;

an adjustment wheel that, when turned, expands or contracts a circumference of the enclosed rounded boundary;

a nested flexible cable ribbon nested within a cavity extending along a length of either the first adjustable flex fit arm or the second adjustable flex fit arm, wherein:
  the nested flexible cable ribbon electrically couples the first compute unit to the second compute unit and to the battery,
  the nested flexible cable ribbon includes a static bend that is secured in place such that a section of the nested flexible cable ribbon forming the static bend is prevented from flexing at the static bend, and in which the nested flexible cable ribbon folds back on itself at a first bend radius, and
  the nested flexible cable ribbon includes a dynamic bend in which the nested flexible cable ribbon folds back on itself at a second bend radius, which is larger than the first bend radius and which is larger than a minimum bend radius threshold, the dynamic bend enabling the nested flexible cable ribbon to expand or contract as a circumference of the enclosed rounded boundary changes.

13. The HMD of claim 12, wherein the minimum bend radius threshold is at least 3 millimeters.

14. The HMD of claim 12, wherein the second bend radius is between 3 millimeters and 20 millimeters.

15. The HMD of claim 12, wherein the first bend radius is less than 3 millimeters.

16. The HMD of claim 12, wherein the first bend radius is less than 3 millimeters and the second bend radius is more than 3 millimeters.

17. The HMD of claim 12, wherein the second bend radius changes as the circumference of the enclosed rounded boundary changes, and wherein the minimum bend radius threshold is never less than 3 millimeters such that the second bend radius changes between 3 millimeters and 20 millimeters.

18. The HMD of claim 12, wherein the second bend radius changes as the circumference of the enclosed rounded boundary changes.

19. The HMD of claim 12, wherein the nested flexible cable ribbon includes a plurality of parallel cables that are substantially disposed within in a same flat plane.

20. The HMD of claim 19, wherein the nested flexible cable ribbon is oriented perpendicularly relative to a plane defined by the enclosed rounded boundary.

21. A head-mounted device (HMD) whose circumference is dynamically adjustable to conform to different head sizes and head shapes, the HMD comprising:
  a front-end housing that includes a first compute unit;
  a back-end housing that includes a second compute unit;
  a first adjustable flex fit arm connecting the front-end housing to the back-end housing;
  a second adjustable flex fit arm connecting the front-end housing to the back-end housing, wherein the front-end housing, the back-end housing, the first adjustable flex fit arm, and the second adjustable flex fit arm define an enclosed rounded boundary that is placeable around a head of a user;
  a plurality of adjustment snaps nested within a cavity extending along a length of the first adjustable flex fit arm and/or the second adjustable flex fit arm; and
  a nested flexible cable ribbon nested within the cavity, wherein:
    the nested flexible cable ribbon electrically couples the first compute unit to the second compute unit,
    the nested flexible cable ribbon includes a static bend that is secured in place such that a section of the nested flexible cable ribbon forming the static bend is prevented from flexing at the static bend, and in which the nested flexible cable ribbon folds back on itself at a first bend radius, and
  the nested flexible cable ribbon includes a dynamic bend in which the nested flexible cable ribbon folds back on itself at a second bend radius, which is larger than the first bend radius and which is larger than a minimum bend radius threshold, the dynamic bend enabling the nested flexible cable ribbon to expand or contract as a circumference of the enclosed rounded boundary changes.

* * * * *